(12) United States Patent
Akutsu

(10) Patent No.: US 9,420,127 B2
(45) Date of Patent: Aug. 16, 2016

(54) APPARATUS USAGE MANAGEMENT SYSTEM AND METHOD

(71) Applicant: Toru Akutsu, Kanagawa (JP)

(72) Inventor: Toru Akutsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 13/780,051

(22) Filed: Feb. 28, 2013

(65) Prior Publication Data

US 2013/0229674 A1  Sep. 5, 2013

(30) Foreign Application Priority Data

Mar. 2, 2012 (JP) ................................. 2012-046106
Dec. 17, 2012 (JP) ................................. 2012-274345

(51) Int. Cl.
*H04N 1/00* (2006.01)
*G06F 21/60* (2013.01)
*G06Q 10/00* (2012.01)

(52) U.S. Cl.
CPC ........... *H04N 1/00408* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 5,956,698 A | 9/1999 | Lacheze et al. | |
| 7,636,174 B2 | 12/2009 | Fukuda | |
| 2002/0143637 A1* | 10/2002 | Shmueli | G06F 21/34 705/26.8 |
| 2005/0238325 A1* | 10/2005 | Tanabe et al. | 386/95 |
| 2008/0030750 A1* | 2/2008 | Kato | 358/1.4 |
| 2008/0239364 A1* | 10/2008 | Nelson et al. | 358/1.15 |
| 2009/0047928 A1* | 2/2009 | Utsch | G06F 21/40 455/410 |
| 2010/0264214 A1 | 10/2010 | Gnanasambandam et al. | |
| 2011/0087770 A1 | 4/2011 | Akiyama et al. | |
| 2011/0176161 A1* | 7/2011 | Matsumoto | 358/1.14 |
| 2011/0276541 A1* | 11/2011 | Ono | 707/687 |
| 2012/0077463 A1* | 3/2012 | Robbins | H04M 3/42374 455/411 |

FOREIGN PATENT DOCUMENTS

| | | |
|---|---|---|
| EP | 1 174 271 | 1/2002 |
| JP | 2004-178324 | 6/2004 |
| JP | 2005-316770 | 11/2005 |
| JP | 2007-193726 | 8/2007 |
| JP | 2011-197721 | 10/2011 |
| WO | WO 03/105439 | 12/2003 |

OTHER PUBLICATIONS

Extended European search report dated May 16, 2013.

* cited by examiner

*Primary Examiner* — Ming Hon
(74) *Attorney, Agent, or Firm* — IPUSA, PLLC

(57) ABSTRACT

An information processor includes a reception part configured to receive user identification information identifying a user from an apparatus that causes the user to input billing destination identification information identifying a billing destination with respect to use of a function in response to reception of a request to execute the function from the user, an obtaining part configured to obtain one or more of items of the billing destination identification information from a storage part, the one or more of the items of the billing destination identification information being stored in the storage part in correlation with the user identification information received from the apparatus, and a response returning part configured to return the obtained one or more of the items of the billing destination identification information to the apparatus as available choices for selection that the user is caused to make by the apparatus.

13 Claims, 29 Drawing Sheets

FIG.9

| MANAGEMENT CODE | PARENT CODE | USERNAME | USE START DATE | USE END DATE | ... |
|---|---|---|---|---|---|
| .. | .. | .. | .. | .. | .. |
| 11113 | 11110 | A,B,C,D,E | 2011/12/16 | 2012/1/16 | ... |
| .. | .. | .. | .. | .. | .. |

| VALIDITY | ON |
|---|---|
| MASK NAME | Anonymous |

| MANAGEMENT CODE | PARENT CODE | USERNAME | USE START DATE | USE END DATE | TEMPORARY USERNAME | TEMPORARY USE VALID PERIOD | 24a |
|---|---|---|---|---|---|---|---|
| .. | .. | .. | .. | .. | .. | .. | .. |
| 11113 | 11110 | A, B, C, D, E | 2011/12/16 | 2012/1/16 | .. . . | | |
| .. | .. | .. | .. | .. | .. | .. | |
| | | | | | | | |

FIG.26

| ORGANIZATION ID | USERNAME | PASSWORD | E-MAIL ADDRESS | REGIONAL NAME | 632 ... |
|---|---|---|---|---|---|
| XXX | A | AAA | A@aaa.com | JAPAN | |
| | B | BBB | B@aaa.com | U.S.A. | |
| | C | CCC | C@aaa.com | EUROPE | |
| YYY | A | AAA | A@bbb.com | ... | |
| | D | DDD | D@bbb.com | ... | |

| ORGANIZATION ID | MACHINE BODY NUMBER | REGIONAL NAME | ... |
|---|---|---|---|
| XXX | 111 | JAPAN | ... |
| | 222 | U.S.A. | ... |
| | 333 | EUROPE | ... |
| YYY | 444 | ... | ... |

FIG.28

| ORGANIZATION ID | MANAGEMENT CODE | PARENT CODE | USERNAME | USE START DATE | USE END DATE |
|---|---|---|---|---|---|
| XXX | 11113 | 11110 | A, B, C | 2012/11/30 | 2012/12/30 |
| | ... | ... | ... | ... | ... |
| YYY | 123456 | 123450 | A, D | 2012/11/20 | 2012/12/10 |
| | ... | ... | ... | ... | ... |

| ORGANIZATION ID | REGIONAL NAME | VALIDITY | MASK NAME |
|---|---|---|---|
| XXX | JAPAN | OFF | Anonymous (IN JAPANESE LANGUAGE) |
| | U.S.A. | OFF | GUEST |
| | EUROPE | ON | Anonymous |
| | CHINA | OFF | Anonymous (IN CHINESE LANGUAGE) |
| YYY | ... | ... | ... |

635

APPARATUS USAGE MANAGEMENT SYSTEM AND METHOD

CROSS-REFERENCE TO RELATED APPLICATIONS

The present application is based upon and claims the benefit of priority of Japanese Patent Application No. 2012-046106, filed on Mar. 2, 2012, and Japanese Patent Application No. 2012-274345, filed on Dec. 17, 2012, the entire contents of which are incorporated herein by reference.

BACKGROUND OF THE INVENTION

1. Field of the Invention

The present invention relates to an information processing method, an information processor, and a computer-readable recording medium storing a program for causing a computer to execute a process.

2. Description of the Related Art

There is a conventional system that aggregates data and reports the results of aggregation on a section basis with respect to usage of image forming apparatuses such as multifunction machines installed in an office or the like. The results of aggregation are used to determine current usage and to work on a future usage policy. The usage includes items such as the number of printouts, the number of copies, the number of pages transmitted and received by facsimile (FAX), paper size, and paper type.

In order to make it possible to aggregate data on a billing destination basis such as a section basis with respect to usage, each of the users of an image forming apparatus is required to input a code indicating a billing destination corresponding to the user via the operations panel of the image forming apparatus.

The image forming apparatus records log information including the above-described items in correlation with the input code.

Reference may be made to Japanese Laid-Open Patent Application No. 2004-178324 for related art.

SUMMARY OF THE INVENTION

According to an aspect of the present invention, an information processor includes a reception part configured to receive user identification information identifying a user from an apparatus that causes the user to input billing destination identification information identifying a billing destination with respect to use of a function in response to reception of a request to execute the function from the user; an obtaining part configured to obtain one or more of items of the billing destination identification information from a storage part, the one or more of the items of the billing destination identification information being stored in the storage part in correlation with the user identification information received from the apparatus; and a response returning part configured to return the obtained one or more of the items of the billing destination identification information to the apparatus as available choices for selection that the user is caused to make by the apparatus.

According to an aspect of the present invention, a computer-readable recording medium stores a program for causing a computer processor to execute receiving user identification information identifying a user from an apparatus that causes the user to input billing destination identification information identifying a billing destination with respect to use of a function in response to reception of a request to execute the function from the user; obtaining one or more of items of the billing destination identification information from a storage part, the one or more of the items of the billing destination identification information being stored in the storage part in correlation with the user identification information received from the apparatus; and returning the obtained one or more of the items of the billing destination identification information to the apparatus as available choices for selection that the user is caused to make by the apparatus.

According to an aspect of the present invention, an information processing method includes receiving, executed by a computer processor, user identification information identifying a user from an apparatus that causes the user to input billing destination identification information identifying a billing destination with respect to use of a function in response to reception of a request to execute the function from the user; obtaining, executed by the computer processor, one or more of items of the billing destination identification information from a storage part, the one or more of the items of the billing destination identification information being stored in the storage part in correlation with the user identification information received from the apparatus; and returning, executed by the computer processor, the obtained one or more of the items of the billing destination identification information to the apparatus as available choices for selection that the user is caused to make by the apparatus.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 9 is a diagram illustrating a configuration of a management code information storage part according to the first embodiment;

FIG. 11 is a diagram illustrating a configuration of a mask information storage part according to the first embodiment;

FIG. 15 is a diagram illustrating a configuration of a management code information storage part according to the second embodiment;

FIG. 26 is a diagram illustrating a configuration of a user information storage part according to the fourth embodiment;

FIG. 28 is a diagram illustrating a configuration of a management code information storage part according to the fourth embodiment; and FIG. 29 is a diagram illustrating a configuration of a mask information storage part according to the fourth embodiment.

DETAILED DESCRIPTION OF THE PREFERRED EMBODIMENTS

As described above, in order to make it possible to aggregate data on a billing destination basis with respect to usage, each user of an image forming apparatus is required to input a code indicating a billing destination corresponding to the user.

According to the conventional system, however, each character of a code is input manually by a user. Accordingly, a wrong code may be input because of a user's input error, or the code of a section to which a user does not belong may be input by the user's spoofing.

According to an aspect of the invention, an information processing method and an information processor may be provided that reduce the possibility of erroneous input of the identification information of a billing destination for usage of an apparatus.

According to an aspect of the invention, it is possible to reduce the possibility of erroneous input of the identification information of a billing destination for usage of an apparatus.

A description is given below, with reference to the accompanying drawings, of embodiments of the present invention.

Figure 1:
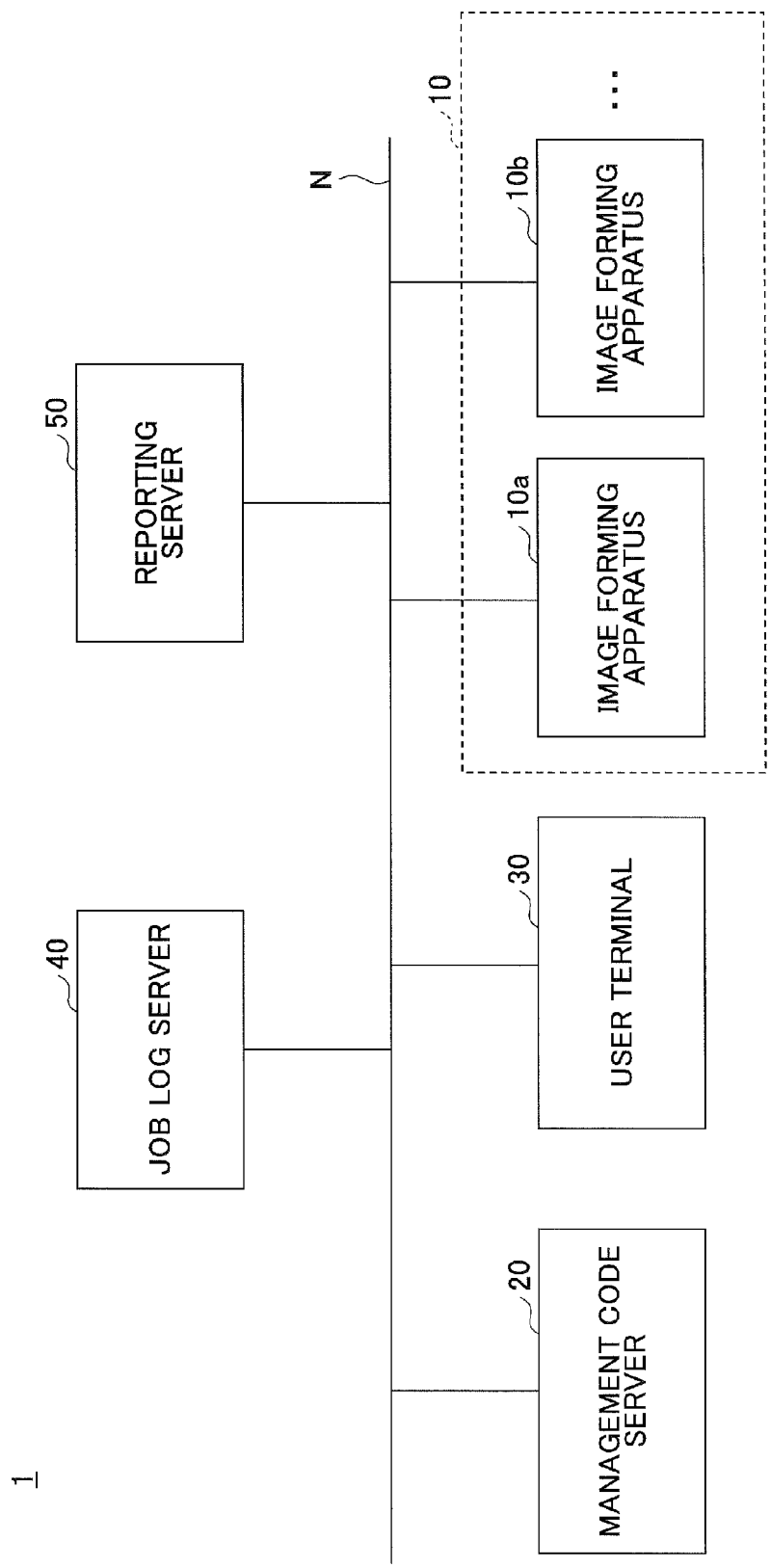
FIG. 1 is a block diagram illustrating a configuration of a usage management system according to an embodiment of the present invention.

FIG. 1 is a block diagram illustrating a configuration of a usage management system according to an embodiment of the present invention. A usage management system 1 of FIG. 1 includes one or more image forming apparatuses 10a, 10b . . . , a management code server 20, a user terminal 30, a job log server 40, and a reporting server 50, which are interconnected by a network N (either wired or wireless) such as a local area network (LAN) or the Internet so as to allow communications to be performed among one another. Hereinafter, the image forming apparatuses 10a, 10b . . . may be collectively referred to as "the image forming apparatus or apparatuses 10" when no distinction is made between the individual image forming apparatuses 10a, 10b et seq.

The image forming apparatus 10 is an apparatus that implements two or more functions such as printing, scanning, copying, and facsimile transmission and reception in a single enclosure (that is, a multifunction machine). However, an apparatus that includes only one of the above-described functions in a single body may be used as the image forming apparatus 10. In this embodiment, the image forming apparatus 10 includes at least a printing function.

The management code server 20 is a computer that manages the correlation between users and corresponding management codes. The management code is identification information that sorts users of the image forming apparatus 10 according to work or to the section to which a user belongs. For example, the management code is used as identification information that identifies a billing destination for usage of a function of (for execution of a job in) the image forming apparatus 10. The billing destination may be a section in a business organization or a unit of work such as a project.

The user terminal 30 is, for example, an information processor that operates as an interface for providing various settings of the management code server 20. Examples of the user terminal 30 include a personal computer (PC), a cellular phone, a smartphone, and a personal digital assistant (PDA).

The job log server 40 is a computer that stores (records) the history information (log information) of usage of functions of (execution of jobs in) the image forming apparatus 10.

The reporting server 50 is a computer that processes the log information stored in the job log server 40 and outputs the results of processing (for example, the results of data aggregation on a management code basis).

Two or all of the management code server 20, the job log server 40, and the reporting server 50 may be implemented by a single computer. Alternatively, the management code server 20, the job log server 40, and the reporting server 50 may be implemented by being distributed among a larger number of computers.

Figure 2:
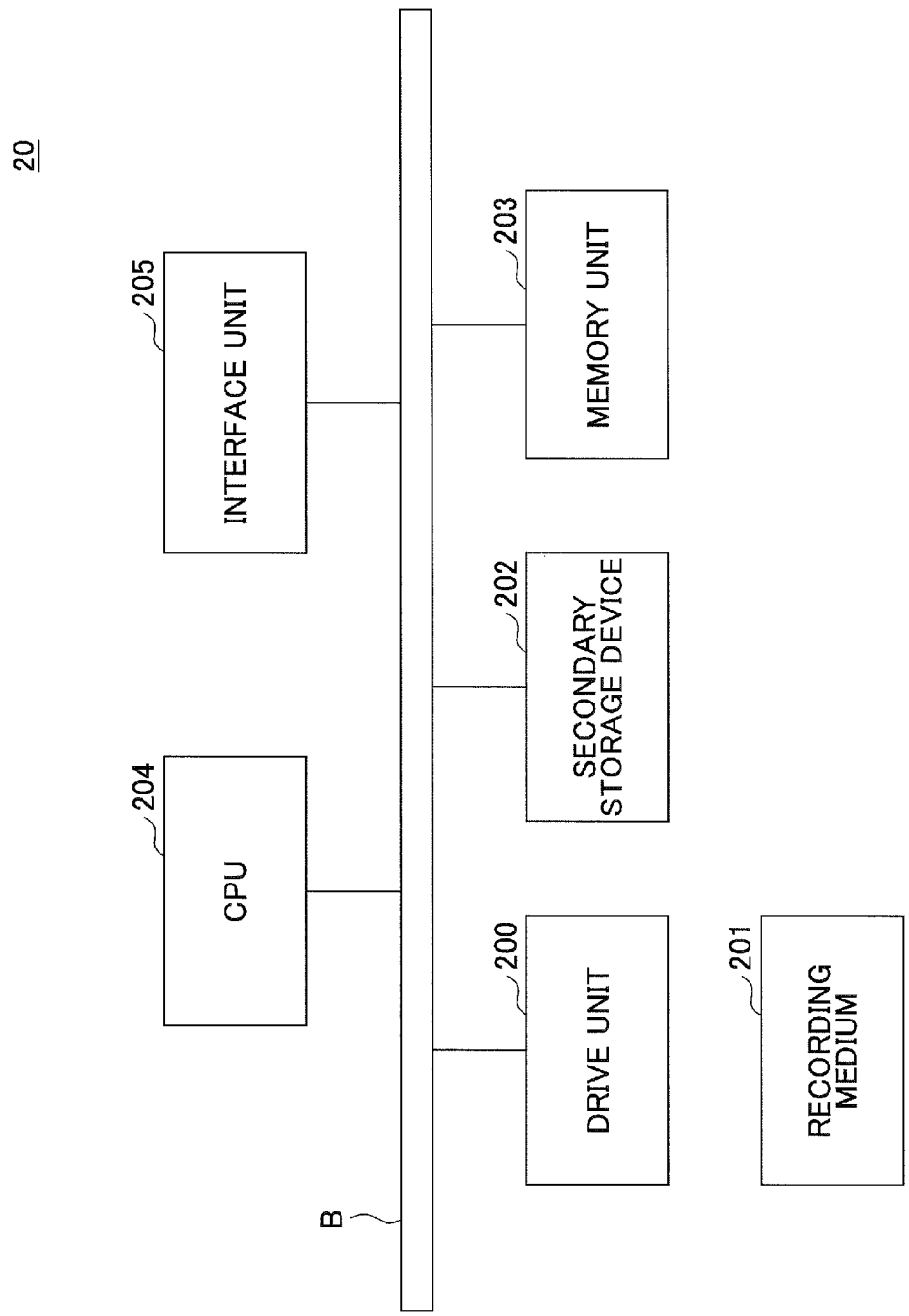
FIG. 2 is a block diagram illustrating a hardware configuration of a management code server according to an embodiment of the present invention.

FIG. 2 is a block diagram illustrating a hardware configuration of the management code server 20 according to an embodiment of the present invention. Referring to FIG. 2, the management code server 20 includes a drive unit 200, a secondary storage device 202, a memory unit 203, a central processing unit (CPU) 204, and an interface unit 205, which are interconnected by a bus B.

A program that implements a process in the management code server 200 is provided by a recording medium 201 such as a CD-ROM. When the recording medium 201 storing a program is loaded into the drive unit 200, the program is installed into the secondary storage device 202 from the recording medium 201 via the drive unit 200. However, a program does not always have to be installed from the recording medium 201, and may be downloaded from another computer via a network such as the network N. The secondary storage device 202 stores the installed program and necessary files and data as well.

In response to receiving an instruction to activate a program, the memory unit 203 reads the program from the secondary storage device 202 and stores the read program. The CPU 204 executes a function pertaining to the management code server 20 in accordance with the program stored in the memory unit 203. The interface unit 205 is used as an interface for connecting to a network such as the network N.

Figure 3:
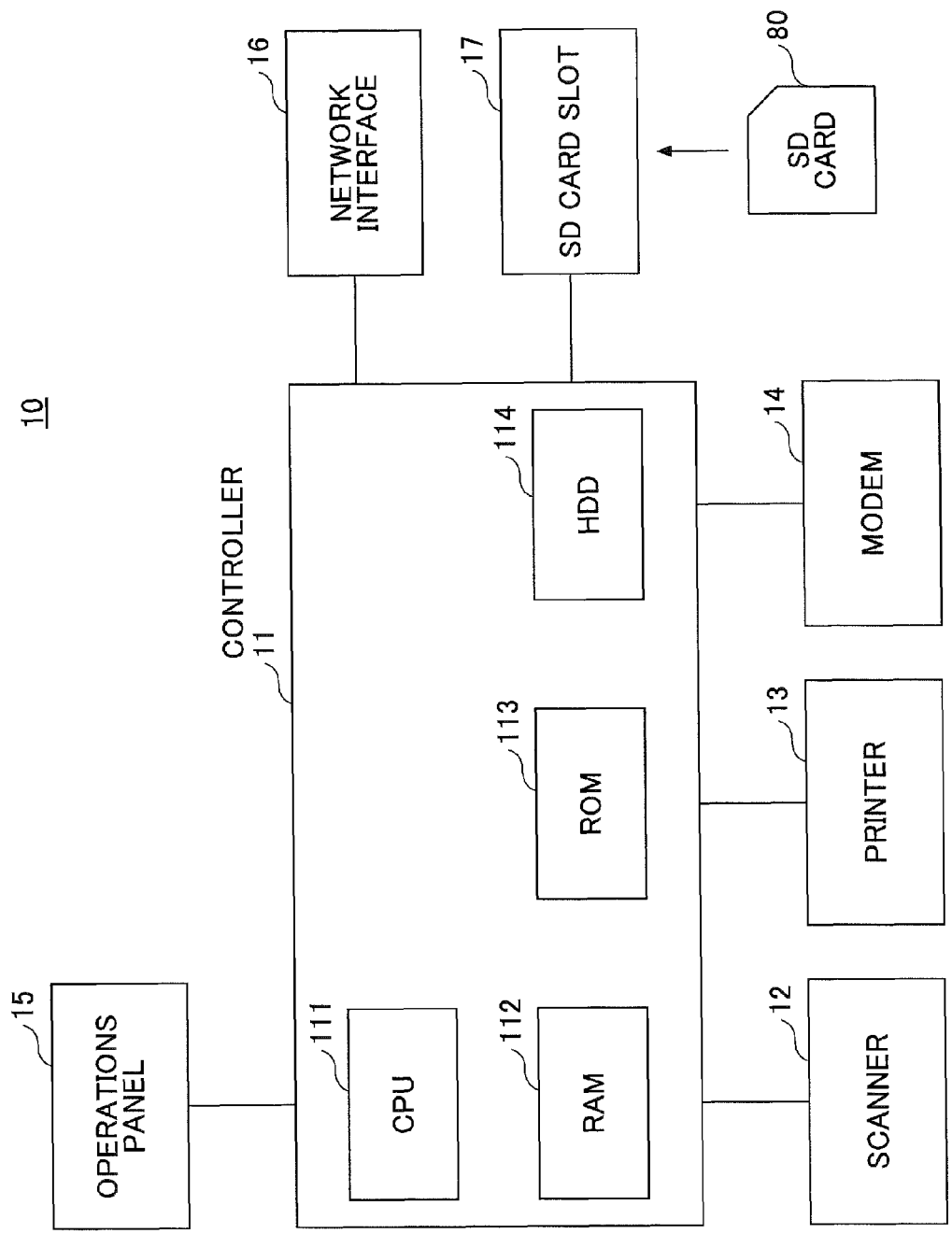
FIG. 3 is a block diagram illustrating a hardware configuration of an image forming apparatus according to an embodiment of the present invention.

FIG. 3 is a block diagram illustrating a hardware configuration of the image forming apparatus 10 according to an embodiment of the present invention. Referring to FIG. 3, the image forming apparatus 10 includes hardware items such as a controller 11, a scanner 12, a printer 13, a modem 14, an operations panel 15, a network interface 16, and an SD card slot 17.

The controller 11 includes a CPU 111, a random access memory (RAM) 112, a read-only memory (ROM) 113, a hard disk drive (HDD) 114, and a non-volatile RAM (NVRAM) 115. Various programs and data used by programs are recorded in the ROM 113. The RAM 112 is used as a storage area for loading a program and as a work area for a loaded program. The CPU 111 implements various kinds of functions by executing a program loaded into the RAM 112. Programs and various data used by programs are recorded in the HDD 114. Information on various settings is recorded in the NVRAM 115.

The scanner 12 is a hardware item (an image reading unit) for reading image data from an original material such as a document. The printer 13 is a hardware item for printing print data on a recording medium such as printing paper (a printing part). The modem 14 is a hardware item for connecting to a telephone line, and is used to transmit and receive image data by facsimile communications. The operations panel 15 is a hardware item including an input part such as buttons for receiving a user's input and a display part such as a liquid crystal panel. The liquid crystal panel may have a touchscreen function. In this case, the liquid crystal panel may also serve as an input part. The network interface 16 is a hardware item for connecting to a network (either wired or wireless) such as a LAN.

The SD card slot 17 is used to read a program recorded in an SD card 80. That is, in the image forming apparatus 10, not only a program recorded in the ROM 113 but also a program recorded in the SD card 80 may be loaded into the RAM 112 and executed by the CPU 111. The SD card 80 may be replaced with other recording media (such as a CD-ROM and a universal serial bus (USB) memory). That is, a recording medium corresponding to the position of the SD card 80 is not limited to a predetermined kind. In this case, the SD card slot 17 may be replaced with a hardware item corresponding to the kind of recording medium that replaces the SD card 80.

Figure 4:
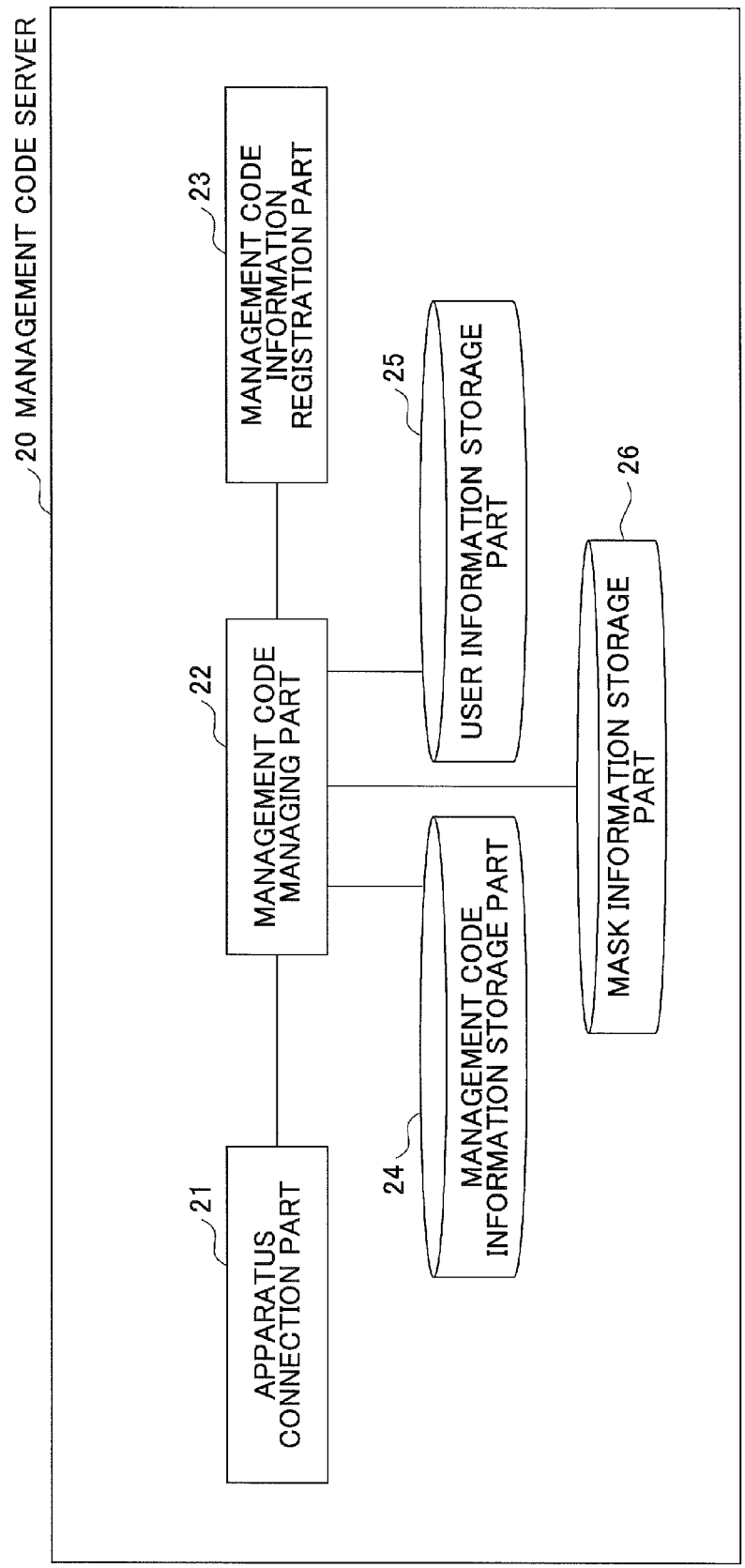
FIG. 4 is a block diagram illustrating a functional configuration of the management code server according to a first embodiment.

FIG. 4 is a block diagram illustrating a functional configuration of the management code server 20 according to a first embodiment. Referring to FIG. 4, the management code server 20 includes an apparatus connection part 21, a management code managing part 22, and a management code information registration part 23. These parts 21 through 23 are implemented by a process that the CPU 204 (FIG. 2) is caused to execute by a program installed in the management code server 20. Further, the management code server 20 uses a management code information storage part 24, a user information storage part 25, and a mask information storage part 26. These storage parts 24 through 26 may be implemented using the secondary storage device 202 (FIG. 2) or a storage device connected to the management code server 20 via a network.

The apparatus connection part 21 receives a request transmitted from the image forming apparatus 10 and returns a response according to the request. Examples of requests transmitted from the image forming apparatus 10 include a request to obtain a list of valid management codes (management codes within their respective valid periods) for a user.

The management code information registration part 23 registers information with the management code information storage part 24 and edits information stored in the management code information storage part 24.

The management code managing part 22 executes a process according to a request received by the apparatus connection part 21, such as a request to obtain a list of management codes.

The management code information storage part 24 stores information related to management codes. Examples of information stored in the management code information storage part 24 include the parent-child relationship (hierarchical relationship) between management codes and the correspondence between management codes and users.

The user information storage part 25 stores the list information of users who are authorized to use the image forming apparatus 10. The mask information storage part 26 stores mask-related information. The mask refers to a mask on the identification information of a user included in log information. For example, the identification information of a user may not be included in log information in order to protect the privacy of the user. In view of such an operation, in this embodiment, it is possible to mask (conceal) the identification information of a user in log information.

Figure 5:
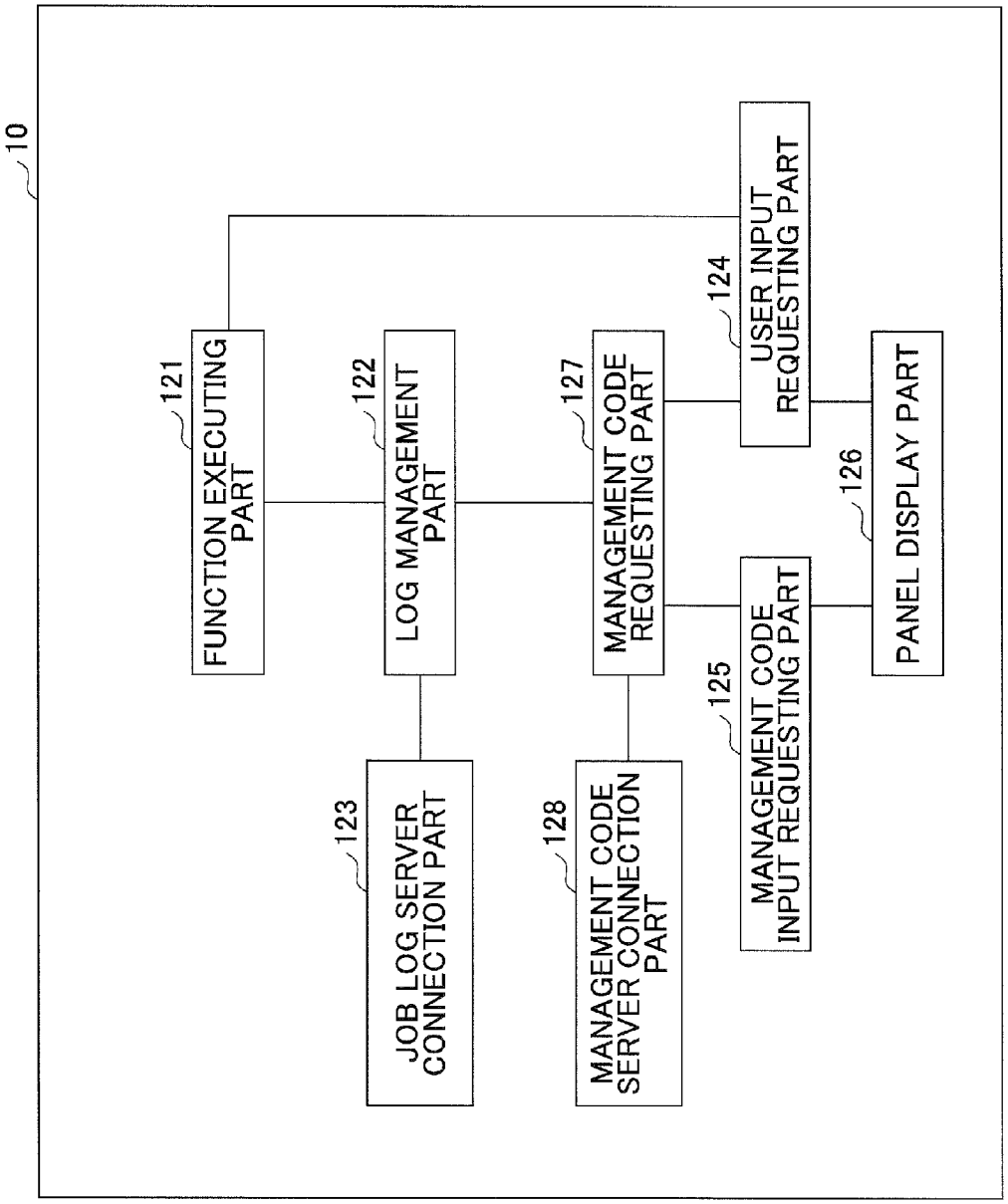
FIG. 5 is a block diagram illustrating a functional configuration of the image forming apparatus according to the first embodiment.

FIG. 5 is a block diagram illustrating a functional configuration of the image forming apparatus 10 according to the first embodiment. Referring to FIG. 5, the image forming apparatus 10 includes a function executing part 121, a log management part 122, a job log server connection part 123, a user input requesting part 124, a management code input requesting part 125, a panel display part 126, a management code requesting part 127, and a management code server connection part 128.

The function executing part 121 controls execution of a function according to a request to use the image forming apparatus 10 input by a user. The log management part 122 generates log information related to the execution of a function controlled by the function executing part 121, and outputs the log information to the job log server connection part 123. The log information includes the identification information of a user who has requested to use the function and the management code selected by the user. The job log server connection part 123 transmits the log information output from the log management part 122 to the job log server 40 (FIG. 1).

The user input requesting part 124 requests a user who uses the image forming apparatus 10 to input the identification information of the user. The panel display part 126 controls displaying a screen on the operations panel 15 (FIG. 3).

The management code requesting part 127 requests the management code server connection part 128 to obtain a management code corresponding to the identification information of a user that the user input requesting part 124 causes the user to input. When a list of management codes is returned from the management code server connection part 128 in response to the request, the management code requesting part 127 inputs the list of management codes to the management code input requesting part 125.

The management code input requesting part 125 instructs the panel display part 126 to display a screen that shows the management codes of the input list as available choices (options) for selection. In response to being notified of a selected management code by the panel display part 126, the management code input requesting part 125 notifies the management code requesting part 127 of the selected management code. The management code requesting part 127 stores the management code of which the management code requesting part 127 has been notified by the management code input requesting part 125 in, for example, the RAM 112 (FIG. 3). The stored management code is included in, for example, log information.

The management code server connection part 128 controls communications with the management code server 20 (FIG. 1).

Figure 6:
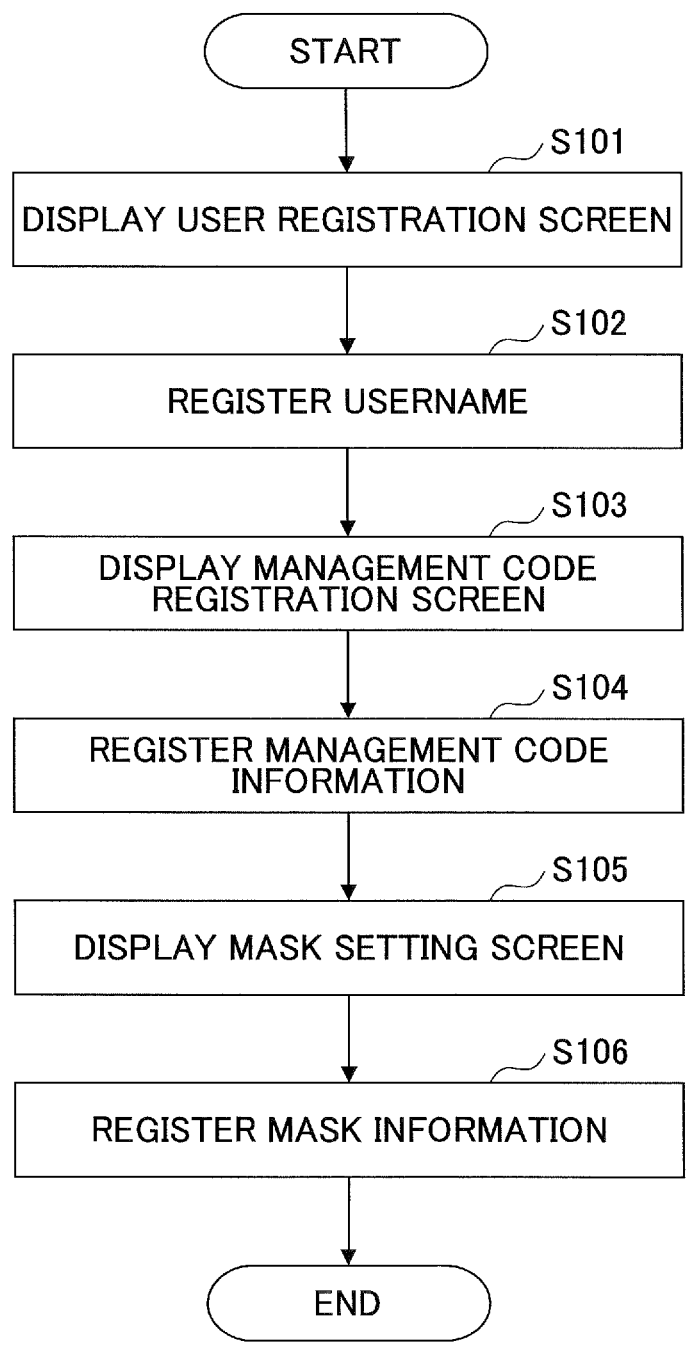
FIG. 6 is a flowchart for illustrating a procedure for a process for registering management code information according to the first embodiment.

Next, a description is given of a procedure executed in the usage management system 1. FIG. 6 is a flowchart for illustrating a procedure for a process for registering (recording) management code information according to the first embodiment. In the procedure of FIG. 6, a user operates the user terminal 30 (FIG. 1).

Referring to FIG. 6 as well as FIG. 4, at step S101, the management code information recording part 23 of the management code server 20 causes a screen for receiving an input of the identification information of a user to be registered with (recorded in) the user information storage part 25 (hereinafter referred to as the "user registration screen") to be displayed on the user terminal 30. For example, the user registration screen is displayed in response to a selection made from a menu on a menu screen displayed prior to step S101. The menu screen refers to a screen including various menus related to the registration (recording) of management code information.

Figure 7:
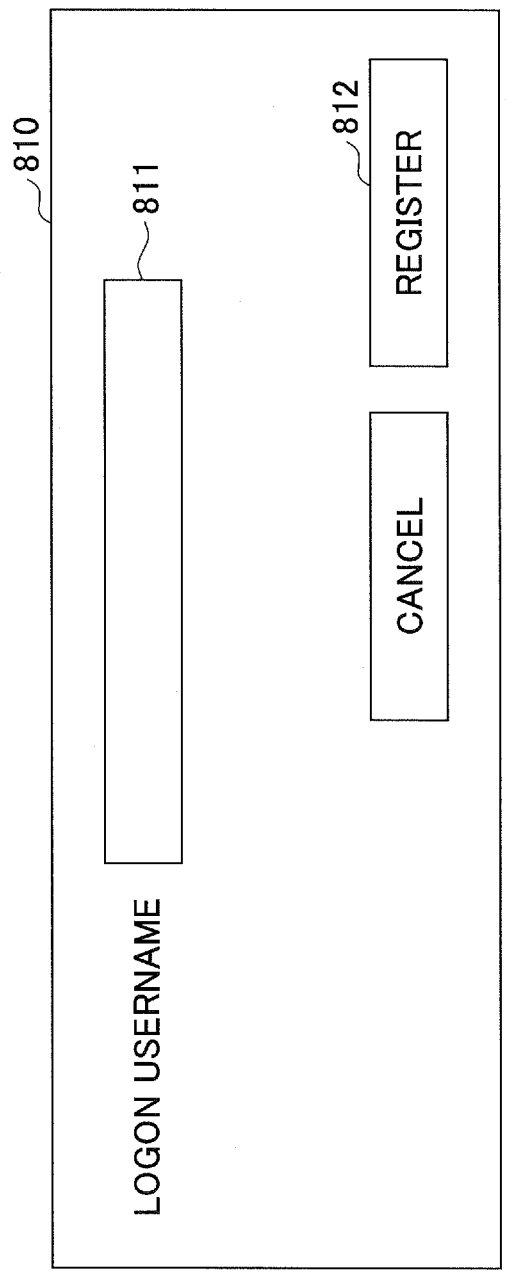
FIG. 7 is a diagram illustrating a display example of a user registration screen according to the first embodiment.

FIG. 7 is a diagram illustrating a display example of the user registration screen according to the first embodiment. As illustrated in FIG. 7, a user registration screen 810 includes a logon username input field 811 and a registration button 812. The logon username input field 811 is a field for receiving an input of a username that is identical to a logon username (the username of a logon user) entered at the time of logging on to the image forming apparatus 10. According to this embodiment, a username is used as an example of the identification information of a user. However, the identification information of a user may be composed of other information such as a user ID or a user code as long as the information makes it possible to identify each user.

When a username is entered in the logon username input field 811 and the registration button 812 is depressed, the username is transmitted from the user terminal 30 to the management code information registration part 23. At step S102, the management code information registration part 23 registers the username with the user information storage part 25. The username is not limited to the username of an administrator.

Next, when an instruction to register a management code is given on the menu screen, at step S103, the management code information registration part 23 causes a management code registration screen to be displayed on the user terminal 30.

Figure 8:
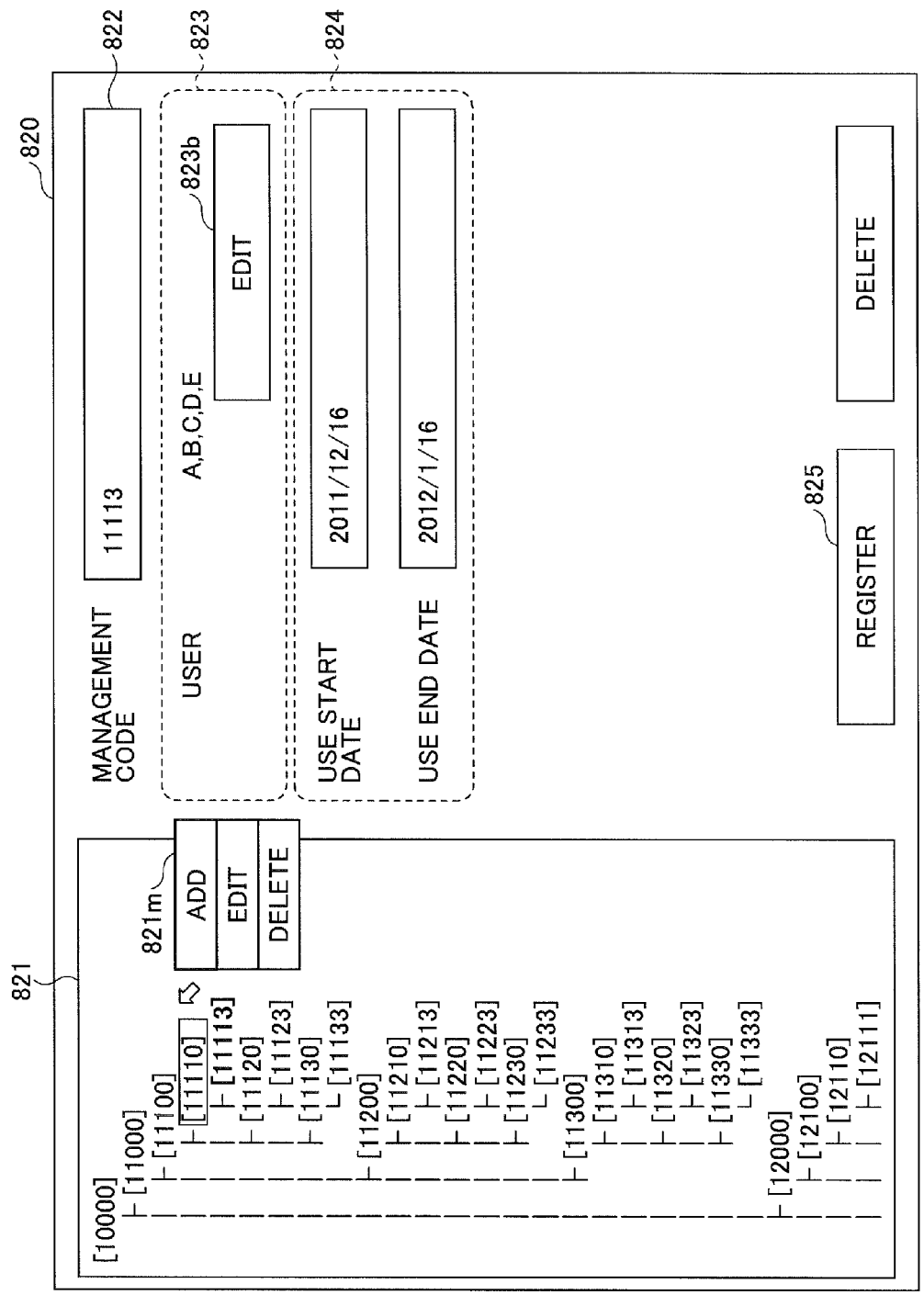
FIG. 8 is a diagram illustrating a display example of a management code registration screen according to the first embodiment.

FIG. 8 is a diagram illustrating a display example of the management code registration screen according to the first embodiment. Referring to FIG. 8, a management code registration screen 820 includes a parent-child relationship setting field 821, a management code input field 822, a username setting field 823, a valid period setting field 824, and a registration button 825.

The management code input field 822 is a field for causing a management code correlated with a username to be entered. The parent-child relationship setting field 821 is a field for causing the parent-child relationship of management codes to be set (determined). For example, when the management code registration screen 820 is displayed, a tree structure showing the parent-child relationship between management codes is displayed in the parent-child relationship setting field 821, using the existing management codes as nodes. When one of the nodes is selected, and, for example, left-clicking or right-clicking is performed on the selected node, a menu 821m is displayed. When "ADD" is selected from the menu 821m, a node corresponding to the management code entered in the management code input field 822 is added as a child node of the selected node. The parent-child relationship between management codes is stored in the management code information storage part 24.

The username setting field 823 is a field for causing a username to be correlated to the management code entered in the management code input field 822 to be set (determined). When an EDIT button 823b in the username setting field 823 is depressed, a list of usernames stored in the user information storage part 25 is displayed. One or more usernames selected from the list are displayed in the username setting field 823. FIG. 8 illustrates a case where the usernames of five users "A, B, C, D and E" are correlated with a management code "11113."

The valid period setting field 824 is a field for causing the valid period of the management code entered in the management code input field 822 to be set (determined). That is, a period from the date entered in USE START DATE to the date entered in USE END DATE is determined as the valid period of the management code. The valid period may be determined by other parameters. For example, a use start date and a valid period may be set. Alternatively, a valid period alone may be set. In this case, the valid period may start at the date of registration.

When each item is entered and the registration button 825 is depressed on the management code registration screen 820, the information input to the management code registration screen 820 is transmitted from the user terminal 30 to the management code information registration part 23 of the management code server 20. At step S104, the management code information registration part 23 registers the information with the management code information storage part 24.

FIG. 9 is a diagram illustrating a configuration of the management code information storage part 24 according to the first embodiment. Referring to FIG. 9, the management code information storage part 24 stores a parent code, a username, a use start date, and a use end date on a management code basis (that is, for each management code).

The parent code is the parent management code of the management code. That is, the tree structure of the parent-child relationship setting field 821 on the management code registration screen 820 is generated by referring to the parent code of each management code. The username is a list of one or more usernames correlated with the management code. The use start date and the use end date are the start date and the end date of the valid period of the management code. FIG. 9 illustrates a case where the information set on the management code registration screen 820 of FIG. 8 is registered. The same username may be correlated with multiple management codes.

Next, when an instruction to register mask information is given on the menu screen, at step S105, the management code information registration part 23 causes a mask setting screen to be displayed on the user terminal 30.

Figure 10:
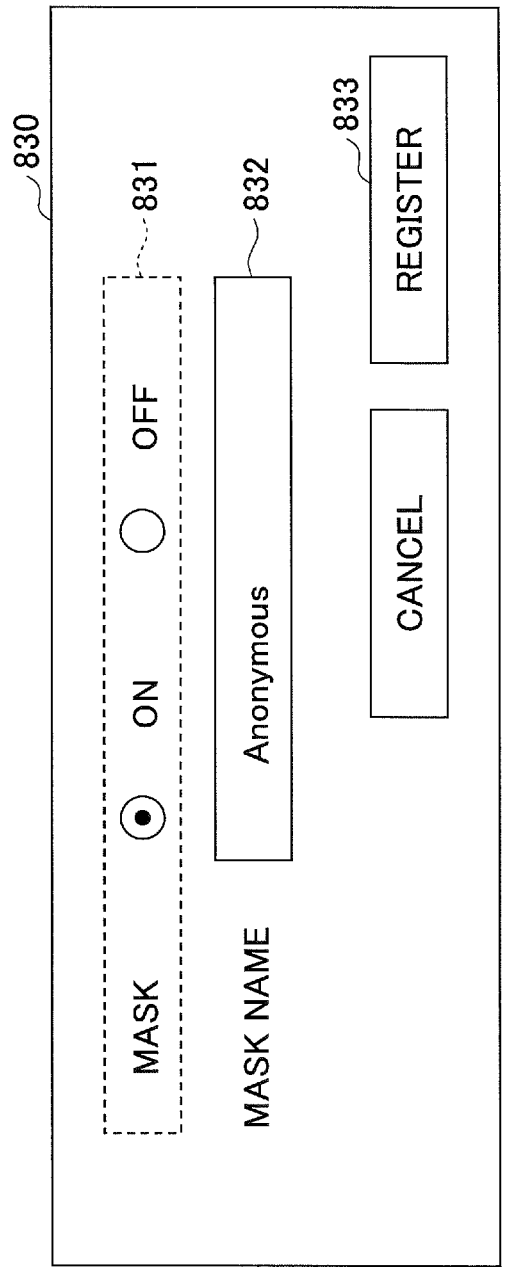
FIG. 10 is a diagram illustrating a display example of a mask setting screen according to the first embodiment.

FIG. 10 is a diagram illustrating a display example of the mask setting screen according to the first embodiment. Referring to FIG. 10, a mask setting screen 830 includes a mask validity setting field 831, a mask name input field 832, and a registration button 833.

The mask validity setting field 831 is a field for causing a determination to be made as to whether to make a mask valid ("ON") or invalid ("OFF"). That is, the mask validity setting field 831 is a field for causing the necessity of a mask to be determined. When the mask is made valid (that is, masking is enabled), a username is masked in log information. When the mask is made invalid (that is, masking is disabled), a username is not masked in log information.

The mask name input field 832 is a field for causing the name of a mask (mask name) to be entered when the mask is valid. The mask name is a character string used to mask a username. That is, when the mask is valid, a username recorded in log information is replaced with the mask name. FIG. 10 illustrates a case where a character string "Anonymous" is set (determined) as a mask name.

When each item is set on the mask setting screen 830 and the registration button 833 is depressed, the information set on the mask setting screen 830 is transmitted from the user terminal 30 to the management code information registration part 23. At step S106, the management code information registration part 23 registers the information with the mask information storage part 26.

Figure 11:
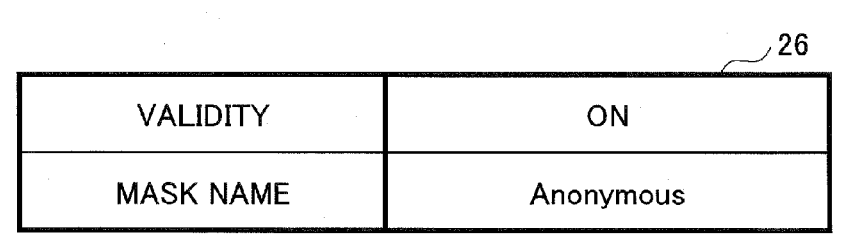

FIG. 11 is a diagram illustrating a configuration of the mask information storage part 26 according to the first embodiment. Referring to FIG. 11, the mask information storage part 26 stores the validity and the mask name of a mask. FIG. 11 illustrates a case where the information set on the mask setting screen 830 of FIG. 10 is registered.

The information stored in the user information storage part 25 and the information stored in the mask information storage part 26 are shared by all management codes. Accordingly, steps S101 and S102, steps S103 and S104, and steps S105 and S106 may be executed at respective different times. However, the mask information may be set on a management code basis.

Figure 12:
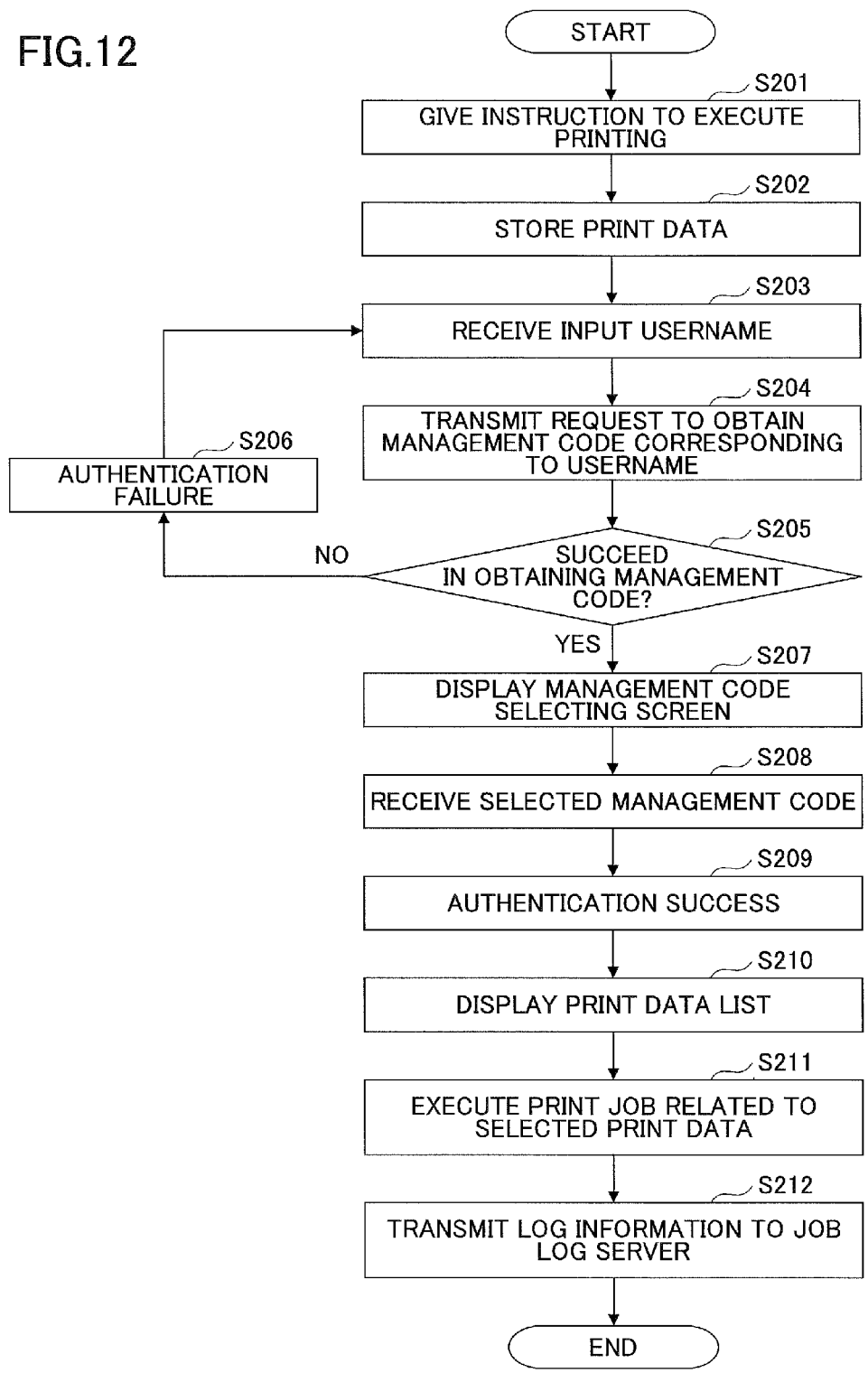
FIG. 12 is a flowchart for illustrating a procedure at the time of execution of a print job according to the first embodiment.

Next, a description is given of a procedure at the time of executing a print job in the image forming apparatus 10. FIG. 12 is a flowchart for illustrating a procedure at the time of execution of a print job according to the first embodiment.

At step S201, for example, a user inputs an instruction to execute printing (a print instruction) with respect to a document that is being edited on the user terminal 30 of the user. A printer driver that is installed in the user terminal 30 generates print data with respect to the document, and transmits the print data to the image forming apparatus 10 specified as a print destination in the print instruction. Here, it is assumed that the image forming apparatus 10a (FIG. 1) is specified as a print destination. At the time of inputting a print instruction, a username is entered through a screen displayed by the printer driver. The username is included in the print data (a print job).

At step S202, the function executing part 121 of the image forming apparatus 10a stores the received print data in the HDD 114. For example, a folder whose folder name is the username included in the print data is created, and the print data is stored in the folder.

Next, the user moves to a location where the image forming apparatus 10a is installed, and directly operates the image forming apparatus 10a. A logon screen for causing a username to be entered is displayed on the operations panel 15 of the image forming apparatus 10a by the user input requesting part 124.

When the username is input through the logon screen, at step S203, the user input requesting part 124 notifies the management code requesting part 127 of the user name. At step S204, the management code requesting part 127 transmits a request to obtain a list of management codes specifying (correlated with) the username to the management code server 20 via the management code server connection part 128.

If a response from the management code server 20 returned in response to the obtaining request indicates the absence of a management code corresponding to the username (NO at step S205), at step S206, the user input requesting part 124 determines that the authentication of the user has failed and rejects the user's logon.

If one or more management codes are included in the response from the management code server 20 (YES at step S205), at step S207, the management code input requesting part 125 causes a screen that shows the one or more management codes as available choices for selection to be displayed on the operations panel 15. In returning management codes, the management code server 20 returns mask information together with the management codes.

When one management code is selected from the available choices for selection by the user at step S208, at step S209, the management code input requesting part 125 determines that the authentication of the user has succeeded and authorizes the user to log on. The username of the user authorized to log on and the selected management code are, for example, stored in the RAM 112 by the management code requesting part 127.

Thus, according to this embodiment, the management code is selected from options that are valid to a user who uses the image forming apparatus 10a. As a result, it is possible to reduce the possibility of a user making input errors.

In response to the authorization of the user's logon, at step S210, the function executing part 121 causes a list of the print data items stored in correlation with the username of the user to be displayed on the operations panel 15. When one of the print data item is selected and an instruction to execute a job is input by the user, at step S211, the function executing part 121 causes the image forming apparatus 10a to execute a print job pertaining to the print data item.

Next, at step S212, the log management part 122 generates log information related to the executed print job, and transmits the log information to the job log server 40 via the job log server connection part 123. The log information includes the username and the management code stored in the RAM 112 and information indicating the content of the job (such as the number of printouts). However, when masking in enabled, a mask name is recorded in place of the username in the log information.

Next, a description is given of a procedure that the management code server 20 executes in response to a request to obtain a management code (a management code obtaining request) at step S204.

Figure 13:
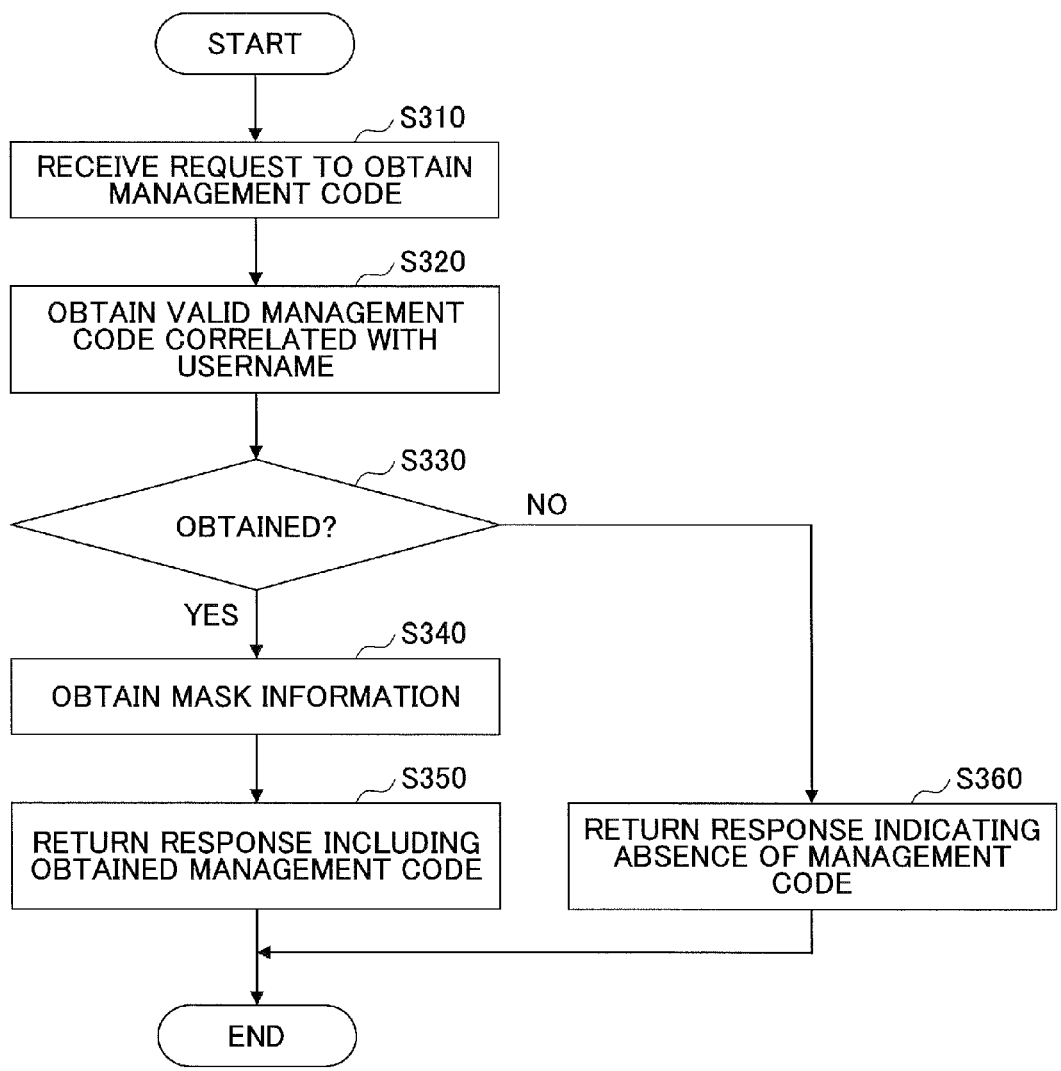
FIG. 13 is a flowchart for illustrating a procedure that the management code server executes in response to a request to obtain a management code corresponding to a username according to the first embodiment.

FIG. 13 is a flowchart for illustrating a procedure that the management code server 20 executes in response to a request to obtain a management code corresponding to a username according to the first embodiment.

At step S310, the apparatus connection part 21 of the management code server 20 receives a management code obtaining request transmitted from the image forming apparatus 10a. Next, at step S320, the management code managing part 22 obtains a list of management codes that are stored in the management code information storage part 24 in correlation with the username specified in the obtaining request and are valid from the management code information storage part 24. For example, a group of records that include the username specified in the obtaining request in the item USERNAME in the management code information storage part 24 (FIG. 9) is extracted. Then, from the group of records, a group of records that have the day (of the execution of the procedure) falling within their respective periods between the use start date and the use end date is further extracted. The management codes included in the extracted records are obtained.

If one or more corresponding management codes are obtained (YES at step S330), at step S340, the management code managing part 22 obtains mask information stored in the mask information storage part 26. Next, at step S350, the apparatus connection part 21 returns a response including the obtained list of management codes and the obtained mask information to the image forming apparatus 10a. If no corresponding management code is obtained (NO at step S330), at step S360, the apparatus connection part 21 returns a response that indicates the absence of a management code corresponding to the specified username to the image forming apparatus 10a.

As described above, according to the first embodiment, the input management code is the management code selected from available choices for selection. Accordingly, management codes that may be input by a user are limited. As a result, it is possible to reduce the possibility of inputting a wrong management code.

Next, a description is given of a second embodiment. In the second embodiment, a description is given of a configuration where the second embodiment differs from the first embodiment. Thus, the second embodiment may be the same as the first embodiment with respect to points not mentioned in particular.

The second embodiment differs from the first embodiment in part of the configuration of the management code registration screen 820 displayed at step S103 of FIG. 6.

Figure 14:
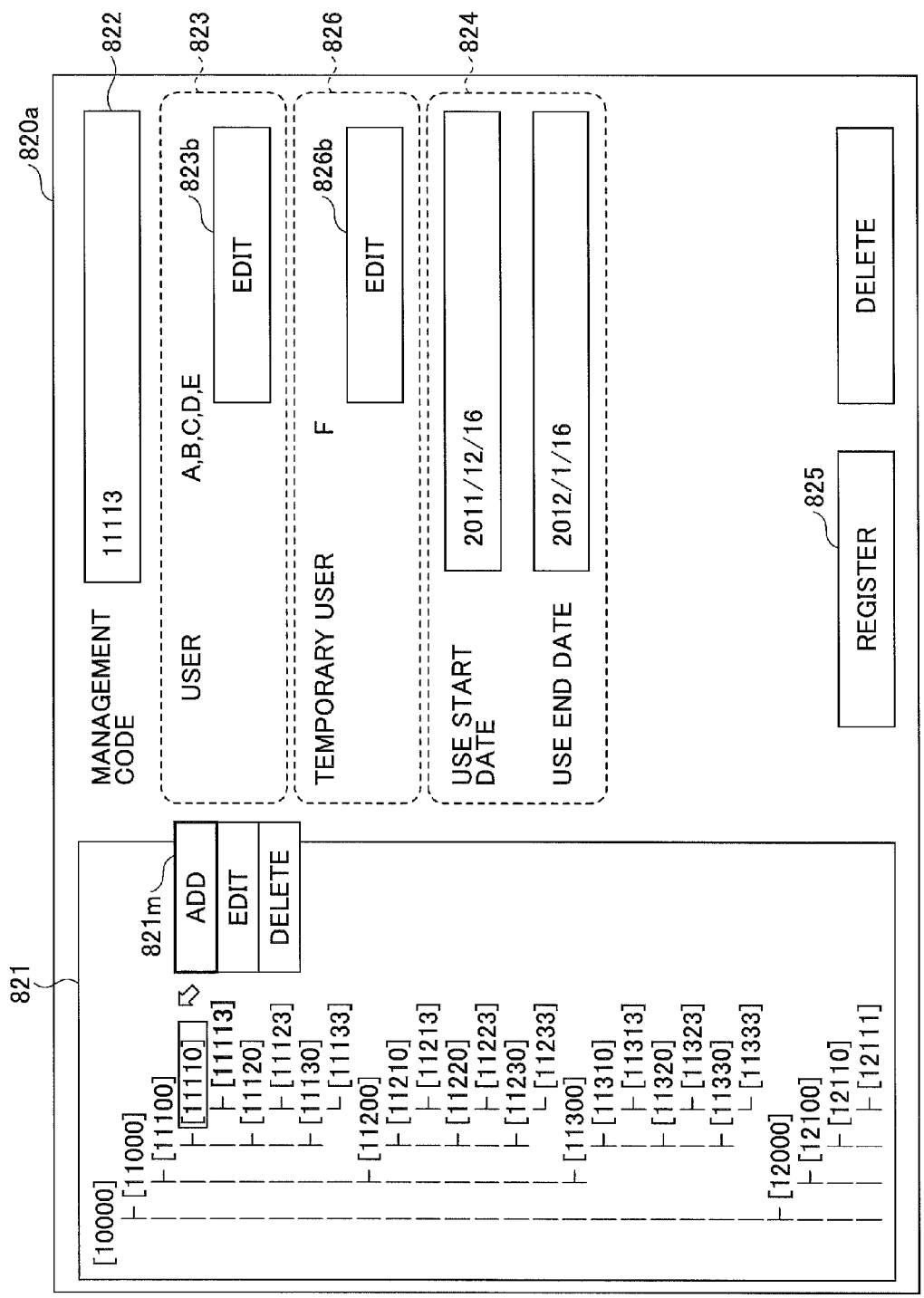
FIG. 14 is a diagram illustrating a display example of a management code registration screen according to a second embodiment.

FIG. 14 is a diagram illustrating a display example of a management code registration screen according to a second embodiment. In FIG. 14, the same elements as those of FIG. 8 are referred to by the same reference numerals, and their description is omitted.

Referring to FIG. 14, compared with the management code registration screen 820 illustrated in FIG. 8, a management code registration screen 820a further includes a temporary username setting field 826 for causing the username of a temporary user to be set. The temporary user refers to a user who is temporarily authorized to use a management code entered in the management code input field 822. The term "temporary" means "fixed-term" or "on a temporary basis." That is, for a temporary user, a valid period (a temporary use valid period) is set with respect to the use of a management code. For example, when an edit button 826b is depressed, a screen is displayed that includes a list of usernames stored in the user information storage part 25 and a field for causing a valid period to be entered. When a username is selected and a valid period is set on the screen, the username is displayed in the temporary username setting field 826.

With a modification in the configuration of the management code registration screen 820, the configuration of the management code information storage part 24 also is modified.

FIG. 15 is a diagram illustrating a configuration of a management code information storage part according to the second embodiment. In FIG. 15, a management code information storage part 24a further includes items of TEMPORARY USERNAME and TEMPORARY USE VALID PERIOD. These items are for storing the information set in the temporary username setting field 826 of the management code registration screen 820a. Like the method of determining the valid period of a management code, the method of determining a temporary use valid period is not limited to a particular method.

Figure 16:
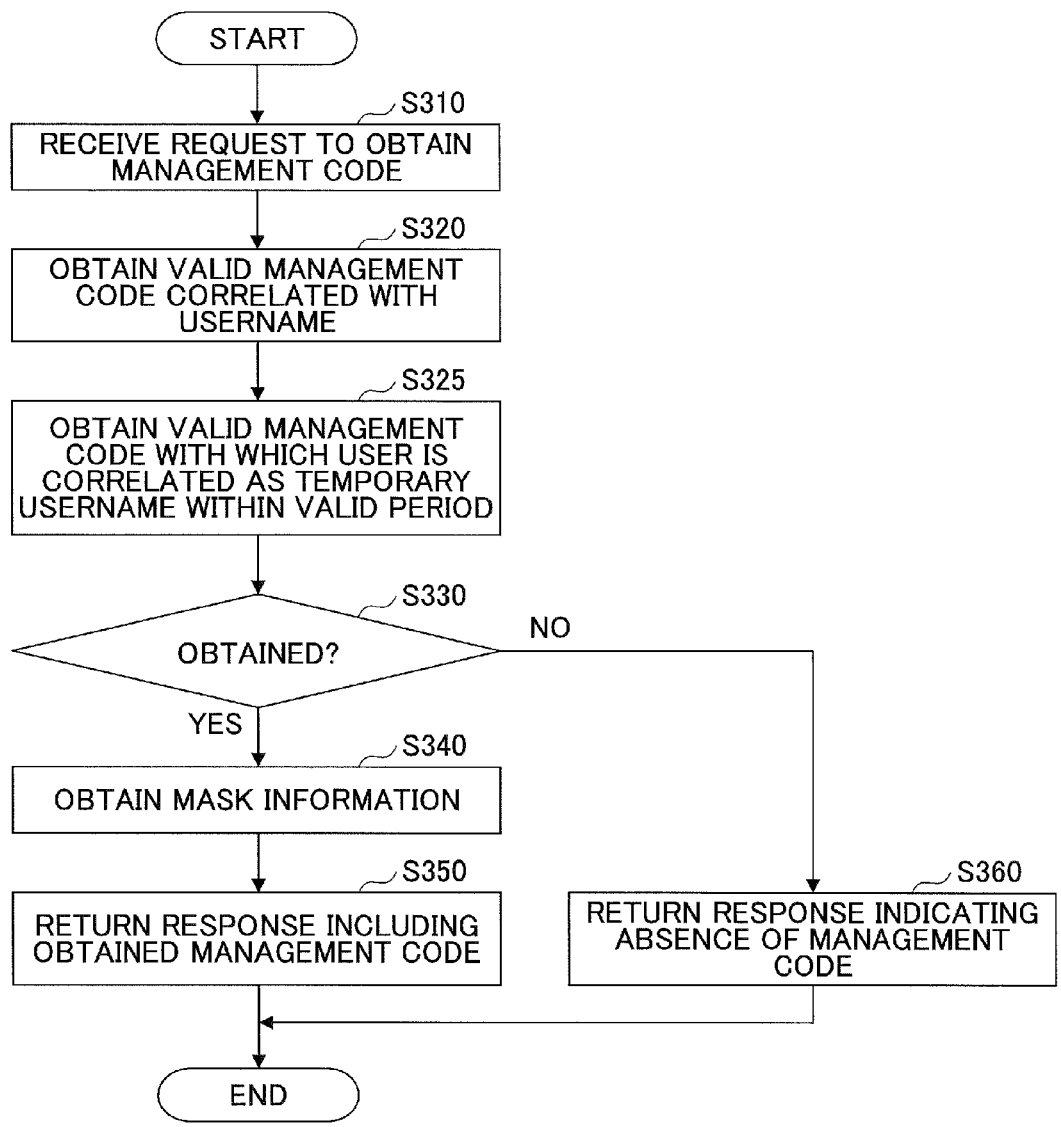
FIG. 16 is a flowchart for illustrating a procedure that the management code server executes in response to a request to obtain a management code corresponding to a user according to the second embodiment.

Based on the management code information storage part 24a illustrated in FIG. 15, the procedure described with reference to FIG. 13 is modified as illustrated in FIG. 16.

FIG. 16 is a flowchart for illustrating a procedure that the management code server 20 executes in response to a request to obtain a management code corresponding to a user according to the second embodiment. In FIG. 16, the same steps as those of FIG. 13 are referred to by the same step numbers, and their description is omitted.

Referring to FIG. 16, compared with FIG. 13, step S325 is newly added. At step S325, the management code managing part 22 obtains, from the management code information storage part 24, a valid management code (a valid code within its valid period) with which a user specified in the management code obtaining request is correlated as a temporary username (the username of a temporary user) within a valid period. The temporary username within a valid period refers to a temporary username that has the day (of the execution of the procedure) falling within a period determined as its temporary use valid period.

At and after step S330, a list of the management codes obtained at steps S320 and S325 are subjected to processing.

As described above, according to the second embodiment, it is possible to temporarily correlate a username with a management code. For example, it is possible to authorize a user who temporarily takes part in a project to use a management code pertaining to the project.

Next, a description is given of a third embodiment. In the third embodiment, a description is given of points in which the third embodiment differs from the first or second embodiment. Accordingly, the third embodiment may be the same as the first or second embodiment with respect to points not mentioned in particular.

Figure 17:
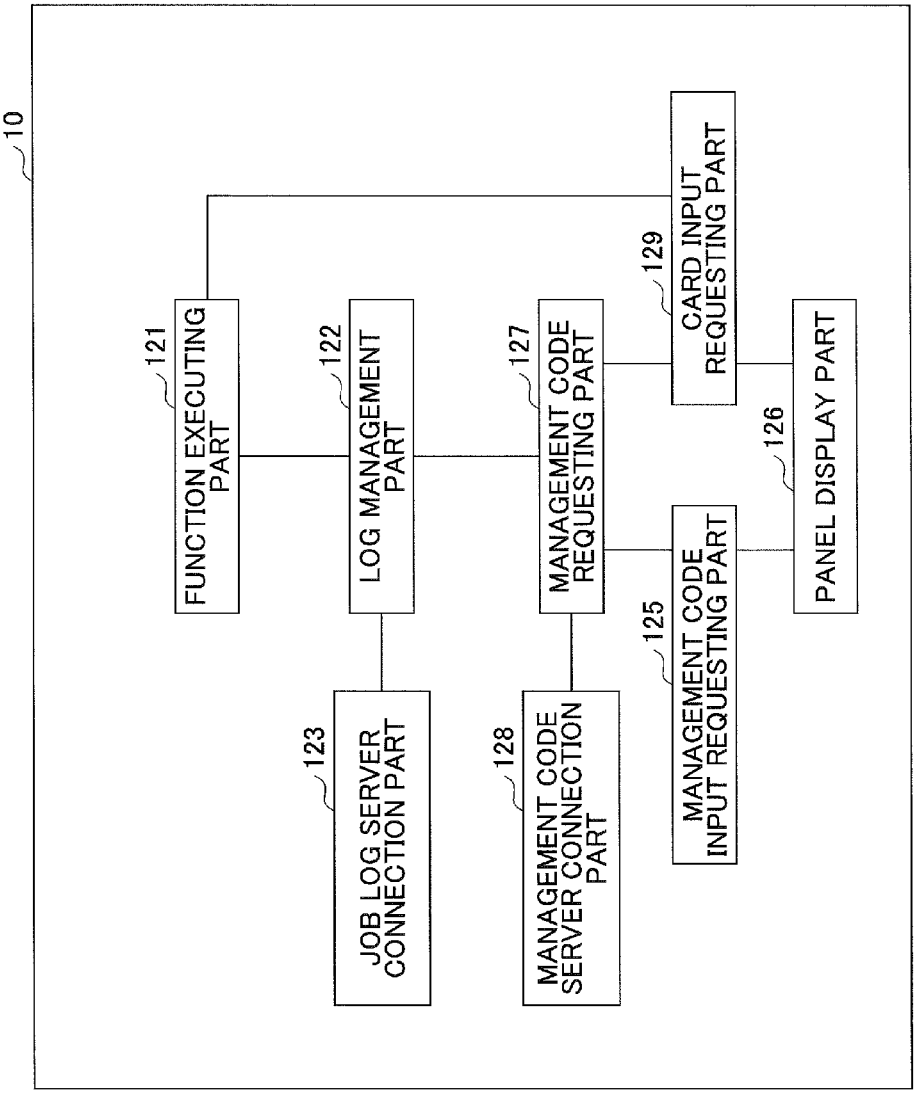
FIG. 17 is a block diagram illustrating a functional configuration of the image forming apparatus according to the third embodiment.

FIG. 17 is a block diagram illustrating a functional configuration of the image forming apparatus 10 according to the third embodiment. In FIG. 17, the same elements as those of FIG. 5 are referred to by the same reference numerals, and their description is omitted.

Referring to FIG. 17, the image forming apparatus 10 includes a card input requesting part 129 in place of the user input requesting part 124. That is, according to the third embodiment, it is assumed that card such as magnetic cards or IC cards are distributed to users and the cards are used when logging on to the image forming apparatus 10. In each of the cards, identification information that identifies the card (hereinafter referred to as the "card ID") is recorded. That is, according to the third embodiment, the card ID is an example of the user identification information.

Figure 18:
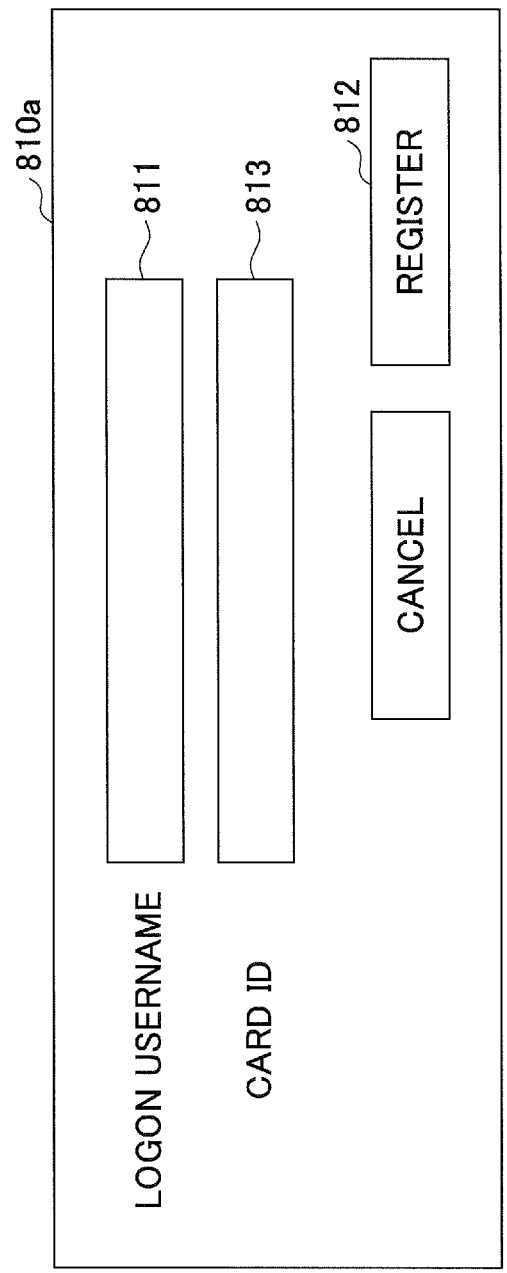
FIG. 18 is a diagram illustrating a display example of a user registration screen according to the third embodiment.

In response to use of the card, at step S101 of FIG. 6, a user registration screen as illustrated in FIG. 18 is displayed, for example.

FIG. 18 is a diagram illustrating a display example of a user registration screen according to the third embodiment. In FIG. 18, the same elements as those of FIG. 7 are referred to by the same reference numerals, and their description is omitted.

A user registration screen 810a illustrated in FIG. 18 further includes a card ID input field 813, compared to the user registration screen 810 of FIG. 7. The card ID input field 813 is a field for causing the card ID of a card possessed by the username entered in the logon username input field 811 to be entered.

Accordingly, at step S102 of FIG. 6, the username entered in the logon username input field 811 and the card ID entered in the card ID input field 813 are stored in the user information storage part 25 in correlation with each other. That is, the user information storage part 25 of the third embodiment stores a username and a card ID in correlation with each other on a user basis (that is, for each user).

Figure 19:
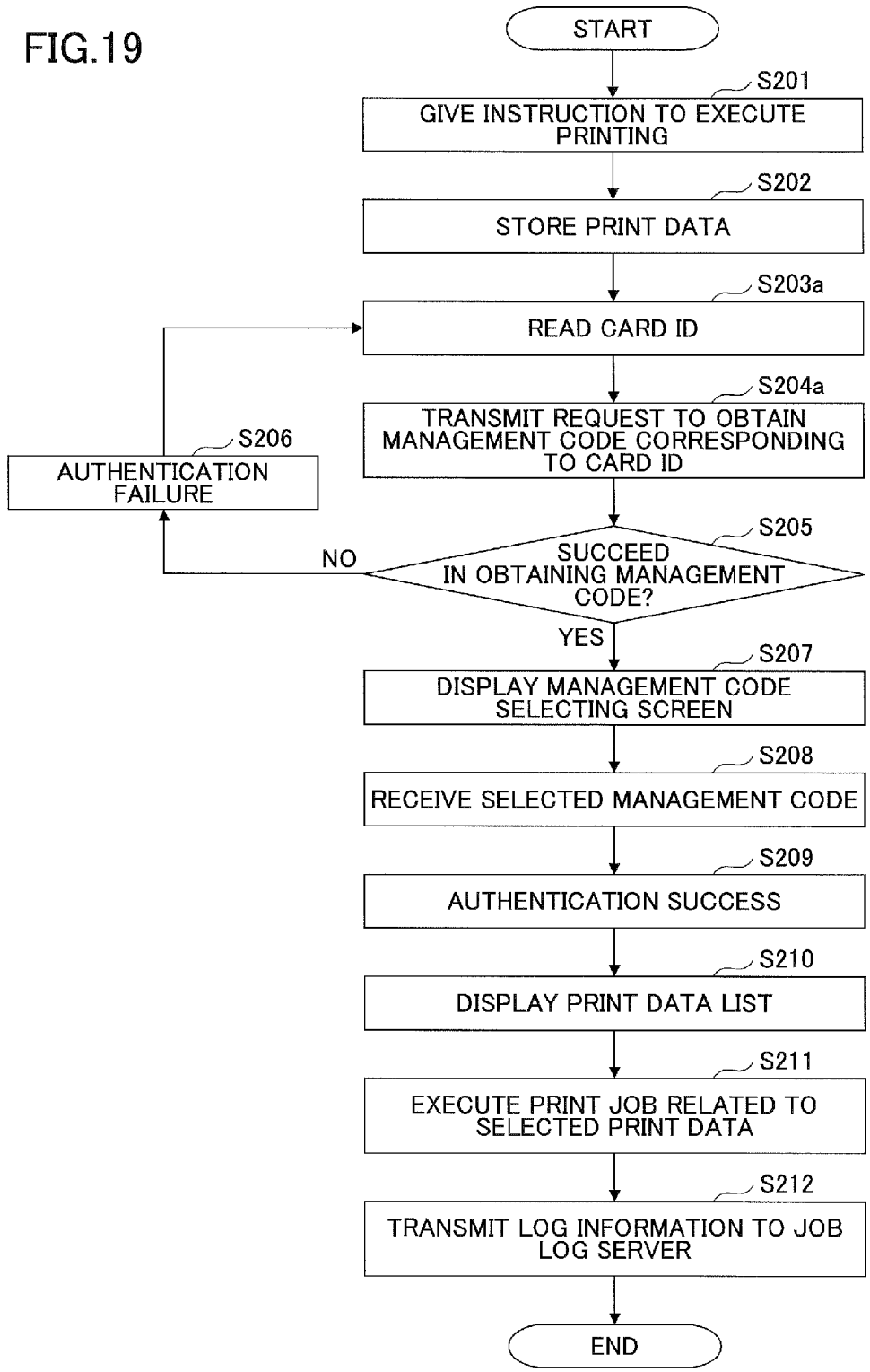
FIG. 19 is a flowchart for illustrating an example procedure at the time of execution of a print job according to the third embodiment.

As a result of the use of the card at a user logon time, the procedure of FIG. 12 is modified as illustrated in FIG. 19, for example.

FIG. 19 is a flowchart for illustrating an example procedure at the time of execution of a print job according to the third embodiment.

In FIG. 19, step S203 of FIG. 12 is replaced with step S203a, and step S204 of FIG. 12 is replaced with step S204a.

At step S203a, the user input requesting part 124 reads a card ID from a card set in a card reader (not graphically illustrated) of the image forming apparatus 10a. The management code requesting part 127 is notified of the card ID. At step S204a, the management code requesting part 127 transmits a request to obtain a list of management codes to the management code server 20 via the management code server connection part 128. The card ID read from the card is specified in the obtaining request.

Figure 20:
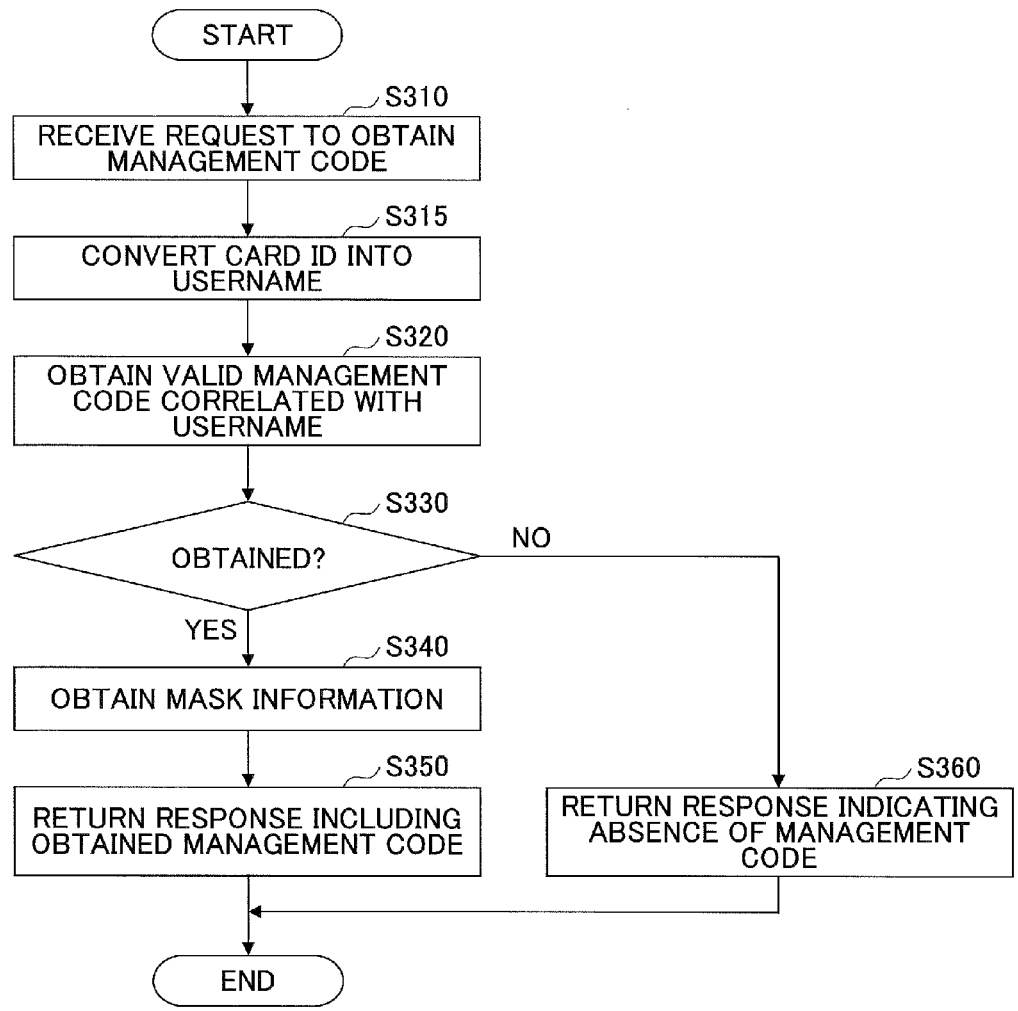
FIG. 20 is a flowchart for illustrating a procedure that the management code server executes in response to a request to obtain a management code corresponding to a user according to the third embodiment.

In response to the obtaining request at step S204a, the management code server 20 executes, for example, the procedure illustrated in FIG. 20.

FIG. 20 is a flowchart for illustrating a procedure that the management code server 20 executes in response to a request to obtain a management code corresponding to a user according to the third embodiment. In FIG. 20, the same steps as those of FIG. 13 are referred to by the same step numbers, and their description is omitted.

In FIG. 20, step S315 is added to the steps of FIG. 13. At step S315, the management code managing part 22 converts the card ID specified in the management code obtaining request to a username. That is, the username correlated with the Card ID in the user information storage part 25 is obtained. In the subsequent steps, a process is executed with respect to the username.

The third embodiment may be combined with the second embodiment.

As described above, according to the third embodiment, also in the case where a card is used for logging on to the image forming apparatus 10, the same effects as in the first or second embodiment may be produced.

Next, a description is given of a fourth embodiment. In the fourth embodiment, a description is given of the case where functions of the management code server 20 and the job log server 40 are applied to services provided in a wide-area environment, such as a cloud service.

Figure 21:
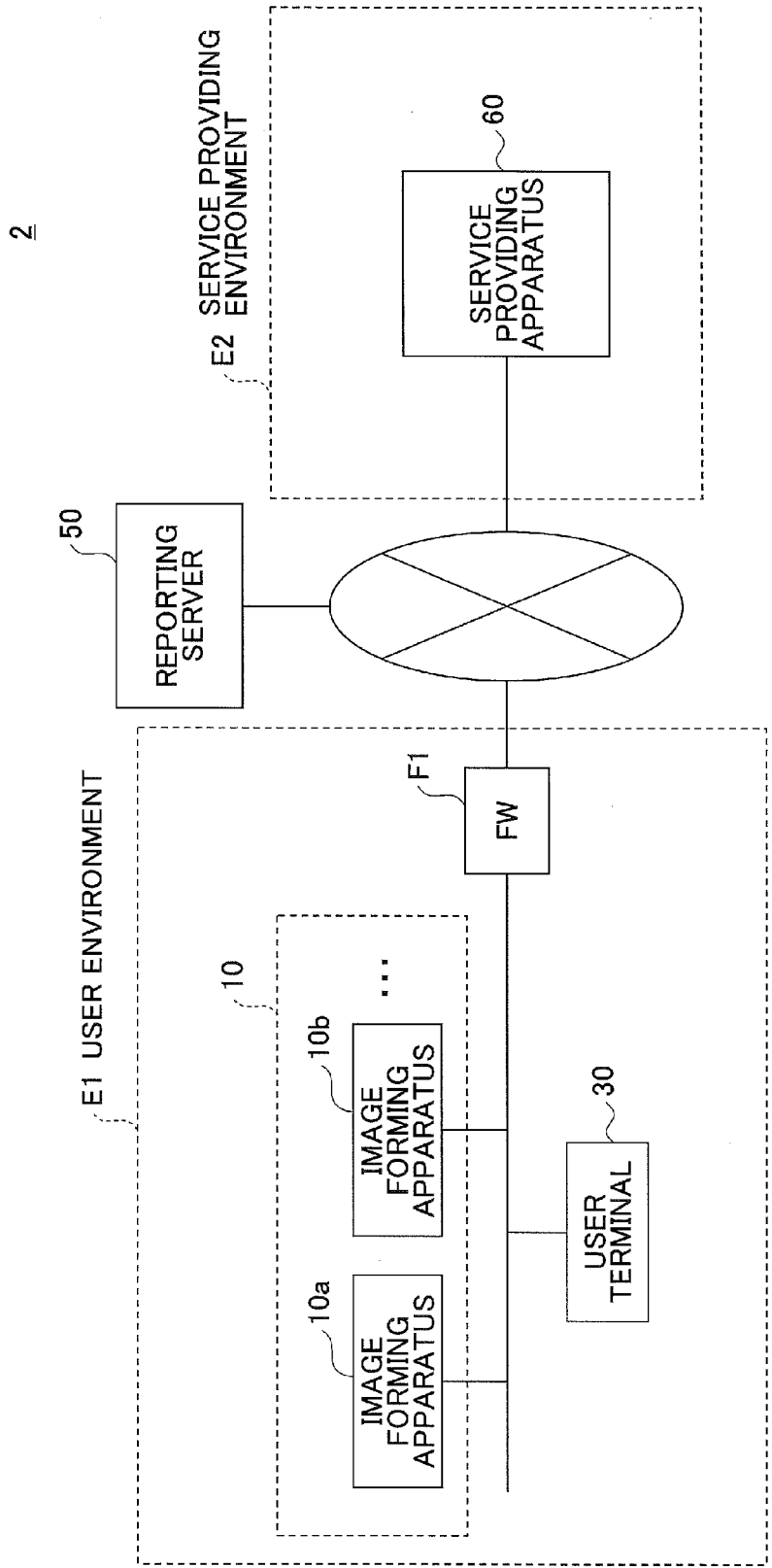
FIG. 21 is a diagram illustrating a configuration of an information processing system according to a fourth embodiment.

FIG. 21 is a diagram illustrating a configuration of an information processing system according to the fourth embodiment. In FIG. 21, the same elements as those of FIG. 1 are referred to by the same reference numerals, and their description is omitted.

In an information processing system 2 illustrated in FIG. 21, a service providing environment E2, a user environment E1, and the reporting server 50 are enabled to communicate with one another via a wide-area network such as the Internet.

The service providing environment E2 is a system environment in an organization that provides a cloud service via a network. In this embodiment, a description is given, taking a cloud service as a specific example. This embodiment, however, may also be applied to services provided via a network, such as services provided by an application service provider (ASP) and Web services.

The service providing environment E2 includes a service providing apparatus 60. The service providing apparatus 60 provides a predetermined service via a network. Examples of services provided by the service providing apparatus 60 include a print service and a delivery service. The print service causes the image forming apparatus 10 of the user environment E1 to print image data uploaded to the service providing apparatus 60. The delivery service delivers image data scanned in the image forming apparatus 10 of the user environment E1 to a set delivery destination. The service providing apparatus 60 may be installed in the user environment E1. That is, the service providing environment E2 may be included in the user environment E1. Further, the service providing apparatus 60 may be composed of either a single computer or multiple computers.

The user environment E1 is a system environment in an organization such as a user company of the image forming apparatus 10. In the user environment E1, at least one image forming apparatus 10 and the user terminal 30 are connected via a network such as a local area network (LAN).

The user environment E1 further includes a firewall F1. The firewall may be the same as a common firewall. The firewall F1 blocks requests from outside the user environment E1, for example. There may be multiple firewalls E1.

Figure 22:
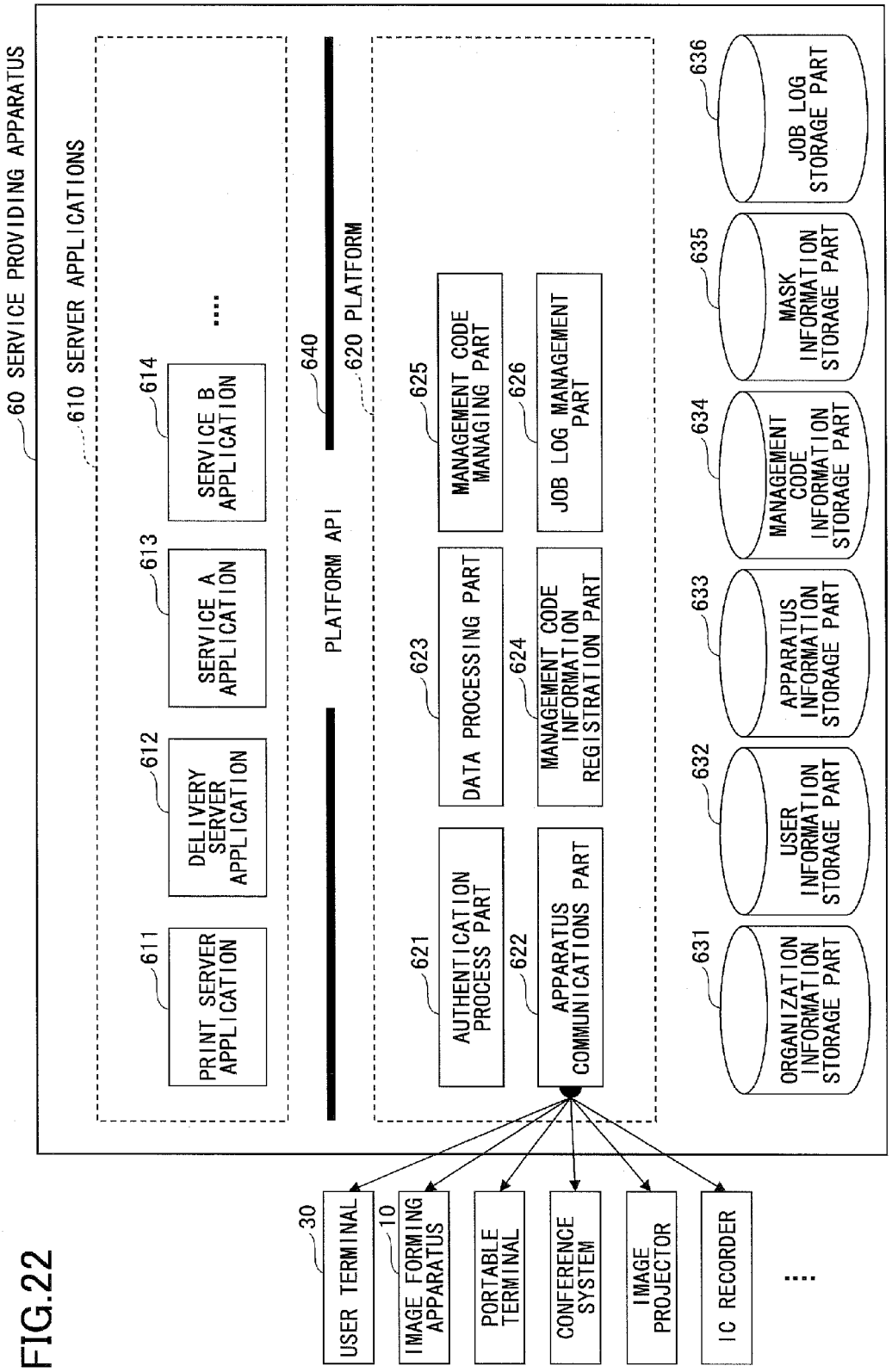
FIG. 22 is a diagram illustrating a functional configuration of a service providing apparatus according to the fourth embodiment.

FIG. 22 is a diagram illustrating a functional configuration of the service providing apparatus 60. In FIG. 22, the service providing apparatus 60 includes software items such as server applications 610 and a platform 620. These software items are composed of one or more programs installed in the service providing apparatus 60, and cause the service providing apparatus 60 to execute predetermined processes.

The service providing apparatus 60 uses an organization information storage part 631, a user information storage part 632, an apparatus information storage part 633, a management code information storage part 634, a mask information storage part 635, and a job log storage part 636. These storage parts 631 through 636 may be implemented using a secondary storage device included in the service providing apparatus 60 or a storage device connected to the service providing apparatus 60 via a network.

The server applications 610 are application programs that realize services provided by the service providing apparatus 60. For example, the server applications 610 realize services in conjunction with the image forming apparatus 10, or in conjunction with an online storage service or other cloud services.

FIG. 22 illustrates a print server application 611, a delivery server application 612, a service A application 613, and a service B application 614 as examples of the server applications 610. The print server application 611 is the server application 610 that executes a process related to a print service. The delivery server application 612 is the server application 610 that executes a process related to a delivery service.

The platform 620 includes functions common to two or more of the server applications 610 or basic functions used by two or more of the server applications 610. Referring to FIG.

22, the platform 620 includes an authentication process part 621, an apparatus communications part 622, a data processing part 623, a management code information registration part 624, a management code managing part 625, and a job log management part 626.

The functions of these parts 621 through 626 are open to the server applications 610 via a platform API 640. In other words, the functions of these parts 621 through 626 are available to the server applications 610 to the extent that they are made open by the platform API 640.

The authentication process part 621 authenticates a user of the user terminal 30 or a user of the image forming apparatus 10. The apparatus communications part 622 controls communications with the user terminal 30 and the image forming apparatus 10. The data processing part 623 executes various processes on various kinds of data such as data received from the image forming apparatus 10. The management code information registration part 624 executes the same process as the management code information registration part 23 (FIG. 4). That is, the management code information registration part 624 registers information with the management code information storage part 634 or the mask information storage part 635 in response to a request from the user terminal 30.

The management code managing part 625 executes the same process as the management code managing part 22 (FIG. 4). The job log management part 626 stores log information transmitted from the image forming apparatus 10 in the job log storage part 636.

The organization information storage part 631 stores the attribute information of organizations that have made a contract for use of a service with the service providing environment E2. Examples of organizations include companies, sections in companies, and a user or a group of users unrelated to a company. There may be a one-to-one correspondence between organization and user environments E1, or multiple user environments E1 may be included in a single organization.

The user information storage part 632 stores the attribute information of individuals belonging to an organization. That is, the attribute information of each of the users who actually use a service provided by the service providing apparatus 60 is stored in the user information storage part 632.

The apparatus information storage part 633 stores attribute information related to the image forming apparatus 10 caused to be conjunct with a service provided by the service providing apparatus 60 in the user environment E1. The management code information storage part 634 stores the same information as the management code information storage part 24 (FIG. 4). However, in the management code information storage part 634, information is stored organization by organization (on an organization basis). The mask information storage part 635 stores mask-related information on an organization basis. The job log storage part 636 stores log information.

In FIG. 22, a portable terminal, a conference system, an image projector, and an IC recorder are illustrated as other examples of apparatuses that may communicate with the service providing apparatus 60 than the user terminal 30 and the image forming apparatus 10.

Further, the form of dividing software items and storage parts illustrated in FIG. 22 is an example, and the software items and storage parts of the service providing apparatus 60 do not have to be divided into a hierarchy as illustrated in FIG. 22. That is, the hierarchical relationship between software items and storage parts in the service providing apparatus 60 is not limited to a particular one as long as the hierarchical relationship makes it possible for the image forming apparatus 10 to cooperate with the server applications 610.

Figure 23:
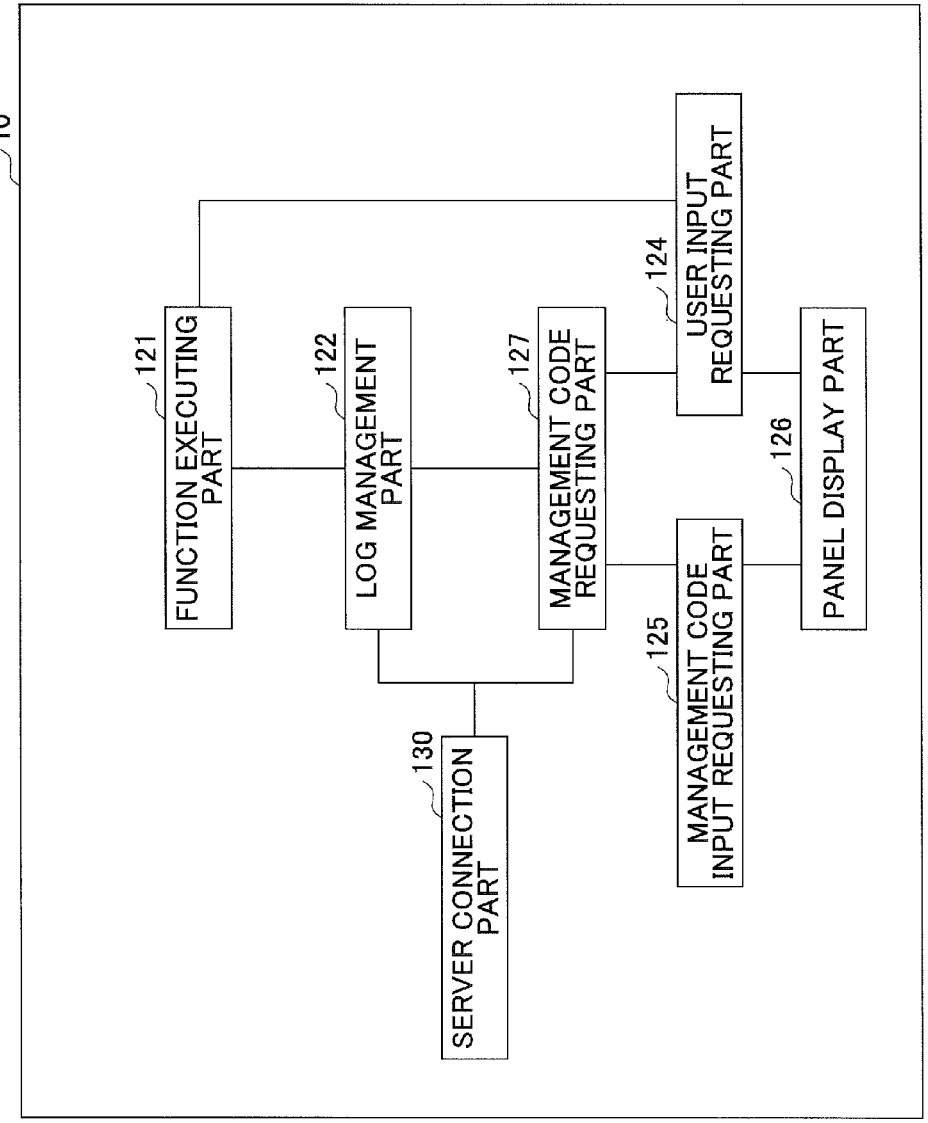
FIG. 23 is a block diagram illustrating a functional configuration of the image forming apparatus according to the fourth embodiment.

FIG. 23 is a block diagram illustrating a functional configuration of the image forming apparatus 10 according to the fourth embodiment. In FIG. 23, the same elements as those of FIG. 5 are referred to by the same reference numerals, and their description is omitted. Referring to FIG. 23, the job log server connection part 123 and the management code server connection part 128 of FIG. 5 are replaced with a server connection part 130. The server connection part 130 controls communications with the service providing apparatus 60.

Figure 24:
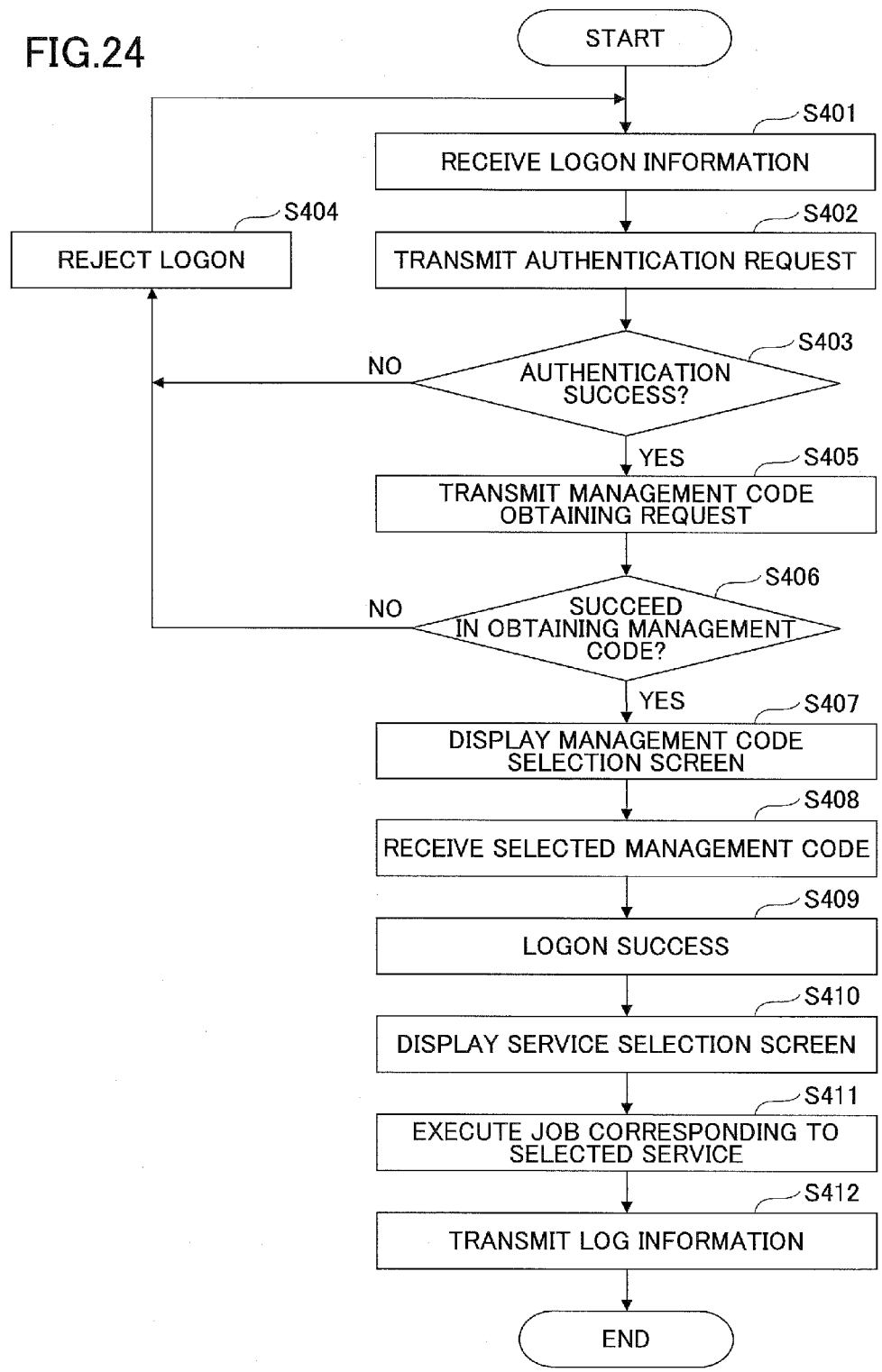
FIG. 24 is a flowchart for illustrating a procedure that the image forming apparatus executes at the time of using a service according to the fourth embodiment.

A description is given below of a procedure executed in the information processing system 2. FIG. 24 is a flowchart for illustrating a procedure that the image forming apparatus 10 executes at the time of using a service according to the fourth embodiment. In the process of FIG. 24, a user operates the image forming apparatus 10a.

At step S401, the user input requesting part 124 receives an input of logon information from a user via a logon screen displayed on the operations panel 15.

Figure 25:
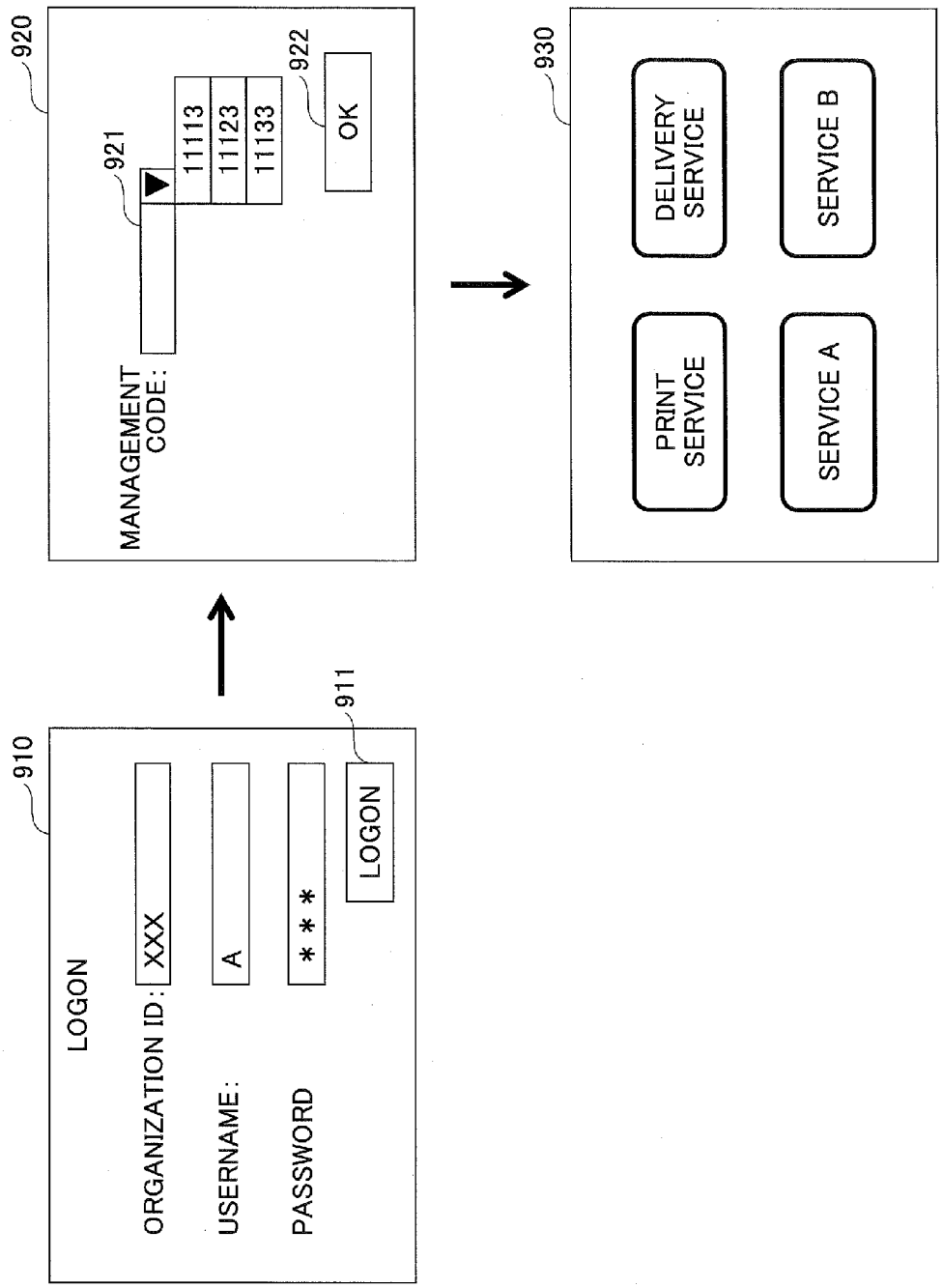
FIG. 25 is a diagram illustrating a transition of screens displayed on an operations panel of the image forming apparatus according to the fourth embodiment.

FIG. 25 is a diagram illustrating a transition of screens displayed on the operations panel 15 of the image forming apparatus 10a according to the fourth embodiment. At step S401, logon information such as an organization ID, a username, and a password is entered on a logon screen 910, and a logon button 911 is depressed. The organization ID is the identification information of each organization. The username is the identification information of each user belonging to an organization.

Next, at step S402, the user input requesting part 124 transmits an authentication request in which the input organization ID, username, and password and the machine body number of the image forming apparatus 10a are specified to the service providing apparatus 60 via the server connection part 130. The machine body number is the identification information of the machine body (individual body) of each image forming apparatus 10. For example, a manufacturing number or serial number may be used as the machine body number. The machine body number is stored in, for example, the ROM 113 or the HDD 114 of each image forming apparatus 10.

The authentication process part 621 of the service providing apparatus 60 executes an authentication process in response to the authentication request. For example, the authentication process part 621 determines whether a combination of the organization ID, username, and password specified in the authentication request is stored in the user information storage part 632.

FIG. 26 is a diagram illustrating a configuration of the user information storage part 632 according to the fourth embodiment. Referring to FIG. 26, the user information storage part 632 stores a username, a password, an e-mail address, and a regional name in correlation with an organization ID for each user belonging to an organization pertaining to the organization ID. The regional name is the name of a region to which a user pertaining to the username belongs. For example, users belonging to multiple regions may belong to a single organization when the organization is a global company.

The authentication process part 621 further determines whether a combination of the organization ID and the machine body number specified in the authentication request is stored in the apparatus information storage part 633.

Figure 27:
FIG. 27 is a diagram illustrating a configuration of an apparatus information storage part according to the fourth embodiment.

FIG. 27 is a diagram illustrating a configuration of the apparatus information storage part 633 according to the fourth embodiment. Referring to FIG. 27, in the apparatus information storage part 633, with each organization ID, the machine body number of the image forming apparatus 10 belonging to an organization pertaining to the organization ID is correlated. Further, information such as a regional name is stored for each machine body number. The regional name is the name of a region where the image forming apparatus pertaining to the machine body number is installed.

When the combination of the organization ID, the username, and the password is stored in the user information storage part 632 and the combination of the organization ID and the machine body number is stored in the apparatus information storage part 633, the authentication process part 621 determines that the authentication has succeeded. If either one of these combinations is not stored in the user information storage part 632 or the apparatus information storage part 633, the authentication process part 621 determines that the authentication has failed. The authentication process part 621 returns information indicating the success or failure of the authentication to the image forming apparatus 10a. Hereinafter, an organization ID, a username, and a machine body number with which authentication has succeeded are referred to as the "logon organization ID," the "logon username," and the "logon machine body number," respectively. In the case of successful authentication, like in common session management, a management area for a session with the image forming apparatus 10a is generated in, for example, a memory unit of the service providing apparatus 60. The logon organization ID, the logon username, and the logon machine body number are stored in the management area. In this case, a token for identifying a session is returned to the image forming apparatus 10a together with the information indicating authentication success or failure.

If information indicating authentication failure is returned from the service providing apparatus 60 (NO at step S403), the user input requesting part 124 rejects the logon of the user. If information indicating authentication success and a token are returned from the service providing apparatus 60 (YES at step S403), the management code requesting part 127 executes step S405. At step S405, the management code requesting part 127 transmits a request to obtain a list of management codes in which the token is specified to the service providing apparatus 60 via the server connection part 130.

In response to the obtaining request, the management code managing part 625 of the service providing apparatus 60 executes, for example, a procedure as described with reference to FIG. 13. However, management codes are obtained from the management code information storage part 634 as illustrated in FIG. 28, for example.

FIG. 28 is a diagram illustrating a configuration of the management code information storage part 634 according to the fourth embodiment. As illustrated in FIG. 28, in the management code information storage part 634 of the fourth embodiment, the information stored in the management code information storage part 24 described with reference to FIG. 9 is stored organization ID by organization ID (on an organization ID basis). Accordingly, at step S320 of FIG. 13, management codes corresponding to the logon organization ID and correlated with the logon username are obtained for selection.

Further, at step S340 of FIG. 13, mask information is obtained from the mask information storage part 635 as illustrated in FIG. 29.

FIG. 29 is a diagram illustrating a configuration of the mask information storage part 635 according to the fourth embodiment. Referring to FIG. 29, the mask information storage part 635 stores information such as validity and a mask name for each regional name in correlation with an organization ID. The meaning of the validity and the mask name are as described above with reference to FIG. 11. The validity and the mask name may be set (determined) region by region because it is believed that the way of thinking about the protection of the privacy of individuals belonging to an organization may differ from region to region. For example, in some regions, it may be believed that it is undesirable to record log information in such a way as to allow each user to be identified, while in other regions, it may be believed that it is desirable to record log information in such a way as to allow each user to be identified.

At step S340, the management code managing part 625 obtains mask information (validity and a mask name) corresponding to the logon organization ID and to a regional name pertaining to the logon machine body number from the mask information storage part 635. Alternatively, the regional name related to the mask information may correspond to a regional name pertaining to the logon username. That is, mask information corresponding to the logon organization ID and to a regional name pertaining to the logon username may be obtained.

When mask information corresponding to a regional name pertaining to the logon machine body number is obtained, the presence or absence of a mask differs depending on which region's image forming apparatus 10 a user uses. For example, when a user belonging to Europe is in the United States on business and uses the image forming apparatus 10 installed in an office in the United States, mask information compliant with the policy of the U.S. office is obtained.

Meanwhile, when mask information corresponding to a regional name pertaining to the logon username is obtained, the presence or absence of a mask differs depending on which region a user belongs to. For example, even when a user belonging to Europe is in the United States on business and uses the image forming apparatus 10 installed in an office in the United States, mask information compliant with the policy of a European office is obtained.

If the response returned from the service providing apparatus 60 in response to the management code obtaining request indicates the absence of a management code (NO at step S405 in FIG. 24), in step S404, the user input requesting part 124 rejects the logon of the user.

If one or more management codes are included in the response from the service providing apparatus 60 (YES at step S406), in step S407, the management code input requesting part 125 causes a management code selection screen 920 (FIG. 25) including the one or more management codes as available choices for selection to be displayed on the operations panel 15. When a management code is returned, mask information also is returned from the service providing apparatus 60 together with the management code.

In the management code selection screen 920 illustrated in FIG. 25, the one or more management codes returned from the service providing apparatus 60 are displayed in a list as available choices for selection in a list box 921.

When one management code is selected from the available choices and an OK button 922 is depressed at step S408, in step S409, the management code input requesting part 125 determines that the logon of the user has succeeded. The username of the user who has successfully logged on and the selected management code are stored in the RAM 112 by the management code requesting part 127, for example.

In response to the logon success, the panel display part 126 causes a service selection screen 930 illustrated in FIG. 25 to be displayed on the operations panel 15. On the service selection screen 930, the respective buttons of the services provided by the service providing apparatus 60 are displayed. Information indicating a list of the services may be stored in advance in the image forming apparatus 10 or the service providing apparatus 60 may be queried about the information before the service selection screen 930 is displayed.

When one of the buttons is selected on the service selection screen 930, in step S411, the function execution part 121 causes the image forming apparatus 10a to execute a job corresponding to a service pertaining to the selected button. For example, when a button corresponding to the delivery service is selected, a job is executed that reads image data from a set original material and transmits the image data to the service providing apparatus 60.

Next, in step S412, the log management part 122 generates log information related to the executed job, and transmits the log information to the service providing apparatus 60 via the server connection part 130. The log information includes the logon username and the management code stored in the RAM 112 and information indicating the contents of the job. However, when masking is enabled, a mask name is recorded in place of the username in the logon information.

When the log information is received in the service providing apparatus 60, the job log management part 626 stores the received log information in the job log storage part 636.

As described above, according to the fourth embodiment, it is possible to cause the first embodiment to accommodate a global environment. The second or third embodiment may be applied to the fourth embodiment.

The services provided by the service providing apparatus 60 according to the fourth embodiment do not always have to be provided as cloud services. For example, the information processing system 2 may be a system inside a global company.

Further, the above-described embodiments may also be applied to apparatuses shared in an office other than the image forming apparatus 10, such as a projector and a video conference system.

Further, in the above-described embodiments, the management code information storage part 24 is an example of a storage part. The apparatus connection part 21 is an example of a reception part and a response returning part. The management code managing part 22 is an example of an obtaining part.

A description is given above of the information processing method and the information processor based on the embodiments. All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An apparatus usage management system, comprising:
an information processing apparatus; and
an apparatus that causes a user to input billing destination identification information identifying a billing destination with respect to use of a function of the apparatus in response to reception of a request to execute the function from the user,
wherein the information processing apparatus includes
a first processor; and
a first memory storing a first program that, when executed by the first processor, causes the information processing apparatus to
receive user identification information identifying the user from the apparatus, the user identification information being input to the apparatus in order for the user to log on to the apparatus;
obtain one or more of items of the billing destination identification information from a storage part, the one or more of the items of the billing destination identification information being stored in the storage part in correlation with the user identification information received from the apparatus; and
return the obtained one or more of the items of the billing destination identification information to the apparatus before the user of the input user identification information logs on to the apparatus, each of the obtained one or more of the items of the billing destination identification information being selectable by the user, and
wherein the apparatus includes
a second processor; and
a second memory storing a second program that, when executed by the second processor, causes the apparatus to
transmit the input user identification information to the information processing apparatus in order for the user to log on to the apparatus;
receive the one or more of the items of the billing destination identification information returned from the information processing apparatus in response to transmitting the input user identification information, before the user at the apparatus logs on to the apparatus; and
authorize the user to log on to the apparatus, when the input user identification information is authenticated and one of the one or more of the items of the billing destination identification information, each of which is valid to the user, is selected by the user.

2. The apparatus usage management system as claimed in claim 1, wherein
the information processing apparatus is caused to obtain, from the storage part storing a valid period of each of the items of the billing destination identification information, the one or more of the items of the billing destination identification information that are stored in correlation with the user identification information received from the apparatus and are within the respective valid periods.

3. The apparatus usage management system as claimed in claim 1, wherein
the information processing apparatus is caused to obtain, from the storage part storing user identification information provided with a valid period in correlation with a part or all of the items of the billing destination identification information, the one or more of the items of the billing destination identification information that are stored in correlation with the user identification information received from the apparatus and are correlated with the user identification information that is valid based on the valid period.

4. The apparatus usage management system as claimed in claim 1, wherein
the information processing apparatus is caused to transmit, to the apparatus, information indicating whether to record a predetermined character string in place of the user identification information in log information, wherein the log information is generated by the apparatus in response to execution of the function, and includes the one of the one or more of the items of the billing destination identification information selected by the user and the user identification information.

5. The apparatus usage management system as claimed in claim 4, wherein
the information processing apparatus is caused to transmit, to the apparatus, the information indicating whether to record the predetermined character string in place of the user identification information based on the storage part storing information as to whether to record the predetermined character string in correlation with attribute information of the user or attribute information of the apparatus.

6. The apparatus usage management system as claimed in claim 1, wherein
when no item of the billing destination identification information is stored in the storage part in correlation with the user identification information received from the apparatus, the information processing apparatus is caused to return a response indicating that no item of the billing destination identification information is stored in the storage part in correlation with the user identification information received from the apparatus, and
the apparatus is caused to determine that the input user identification information is not authenticated in response to receiving said response from the information processing apparatus.

7. The apparatus usage management system as claimed in claim 1, wherein the information processing apparatus is further caused to
obtain a predetermined character string in response to obtaining the one or more of the items of the billing destination identification information, the predetermined character string being to be recorded in place of the user identification information in log information generated by the apparatus in response to execution of the function; and
return the obtained predetermined character string with the obtained one or more of the items of the billing destination identification information to the apparatus before the user of the input user identification information logs on to the apparatus.

8. An apparatus usage management method for use in a system including an information processing apparatus and an apparatus that causes a user to input billing destination information identifying a billing destination with respect to use of a function of the apparatus in response to reception of a request to execute the function from the user, the apparatus usage management method comprising:
transmitting, by the apparatus, user identification information identifying the user input to the apparatus to the information processing apparatus in order for the user to log on to the apparatus;
receiving, by the information processing apparatus, the input user identification information transmitted from the apparatus;
obtaining, by the information processing apparatus, one or more of items of the billing destination identification information from a storage part, the one or more of the items of the billing destination identification information being stored in the storage part in correlation with the user identification information received from the apparatus;
returning, by the information processing apparatus, the obtained one or more of the items of the billing destination identification information to the apparatus before the user of the input user identification information logs on to the apparatus, each of the obtained one or more of the items of the billing destination identification information being selectable by the user;
receiving, by the apparatus, the one or more of the items of the billing destination identification information returned from the information processing apparatus in response to transmitting the input user identification information, before the user at the apparatus logs on to the apparatus; and
authorizing, by the apparatus, the user to log on to the apparatus, when the input user identification information is authenticated and one of the one or more of the items of the billing destination identification information, each of which is valid to the user, is selected by the user.

9. The apparatus usage management method as claimed in claim 8, wherein
said obtaining obtains, from the storage part storing a valid period of each of the items of the billing destination identification information, the one or more of the items of the billing destination identification information that are stored in correlation with the user identification information received from the apparatus and are within the respective valid periods.

10. The apparatus usage management method as claimed in claim 8, wherein
said obtaining obtains, from the storage part storing user identification information provided with a valid period in correlation with a part or all of the items of the billing destination identification information, the one or more of the items of the billing destination identification information that are stored in correlation with the user identification information received from the apparatus and are correlated with the user identification information that is valid based on the valid period.

11. The apparatus usage management method as claimed in claim 8, further comprising:
transmitting, by the information processing apparatus, information indicating whether to record a predetermined character string in place of the user identification information in log information to the apparatus, wherein the log information is generated by the apparatus in response to execution of the function, and includes the one of the one or more of the items of the billing destination identification information selected by the user and the user identification information.

12. The apparatus usage management method as claimed in claim 11, wherein
said transmitting by the information processing apparatus transmits, to the apparatus, the information indicating whether to record the predetermined character string in place of the user identification information based on the storage part storing information as to whether to record the predetermined character string in correlation with attribute information of the user or attribute information of the apparatus.

13. An apparatus that causes a user to input billing destination identification information identifying a billing destination with respect to use of a function of the apparatus in response to reception of a request to execute the function from the user, the apparatus comprising:
a processor; and
a memory storing a program that, when executed by the processor, causes the apparatus to
transmit, to an information processing apparatus, user identification information identifying the user input to the apparatus in order for the user to log on to the apparatus;

receive one or more of items of the billing destination identification information obtained from a storage part and returned from the information processing apparatus in response to transmitting the user identification information before the user at the apparatus logs on to the apparatus, the one or more of the items of the billing destination identification information being stored in the storage part in correlation with the user identification information received from the apparatus; and authorize the user to log on to the apparatus, when the input user identification information is authenticated and one of the one or more of the items of the billing destination information, each of which is valid to the user, is selected by the user.

* * * * *